United States Patent [19]
Baird et al.

[11] Patent Number: 5,802,394
[45] Date of Patent: Sep. 1, 1998

[54] METHOD FOR ACCESSING ONE OR MORE STREAMS IN A VIDEO STORAGE SYSTEM USING MULTIPLE QUEUES AND MAINTAINING CONTINUITY THEREOF

[75] Inventors: Randall B. Baird, San Jose; Martin J. McFadden, Cupertino, both of Calif.

[73] Assignee: Starlight Networks, Inc., Mountain View, Calif.

[21] Appl. No.: 254,576

[22] Filed: Jun. 6, 1994

[51] Int. Cl.$^6$ .................................................... G06F 13/14
[52] U.S. Cl. ............................................ 395/825; 395/441
[58] Field of Search ................................. 395/438–441, 395/859, 825–826

[56] References Cited

U.S. PATENT DOCUMENTS

| | | | |
|---|---|---|---|
| 4,536,836 | 8/1985 | Dodd et al. | 395/440 |
| 4,636,946 | 1/1987 | Hartnung et al. | 395/463 |
| 4,688,168 | 8/1987 | Gudaitis et al. | 395/287 |

(List continued on next page.)

FOREIGN PATENT DOCUMENTS

| | | | |
|---|---|---|---|
| A-0 458 554 A2 | 11/1991 | European Pat. Off. | G06F 3/06 |
| A-0 521 630 A3 | 1/1993 | European Pat. Off. | G06F 11/00 |
| A-0 535 807 A2 | 4/1993 | European Pat. Off. | G06F 15/16 |
| A-0 701 198 A1 | 3/1996 | European Pat. Off. | G06F 3/06 |
| WO-A-90/00280 | 1/1990 | WIPO | G06F 11/10 |
| WO-A-91/13404 | 9/1991 | WIPO | G06F 11/10 |
| WO-A-92/04674 | 3/1992 | WIPO | G06F 12/08 |
| WO-A-94/12937 | 6/1994 | WIPO | G06F 15/00 |

OTHER PUBLICATIONS

ACM Transaction on Computer Systems, vol. 10, No. 4, Nov. 1992, New York, USA, pp. 311–337 D.P. Anderson et al. "A File System for Continuous Media".
Network and Operating Systems Support for Digital Audio and Video, 12 Nov. 1992, La Jolla, CA, USA pp. 44–55, P.S. Yu et al., "Design and Analysis of a Grouped Sweeping Scheme for Multimedia Storage Management".

(List continued on next page.)

Primary Examiner—Jack B. Harvey
Assistant Examiner—Sumati Lefkowitz
Attorney, Agent, or Firm—Meltzer, Lippe, Goldstein, Wolf & Schlissel, P.C.

[57] ABSTRACT

A method is disclosed for interfacing a video storage system, such as a disk array, and a video stream application executing on a computer network or stand-alone system. The interface provides a method for storing video stream data by allocating storage space in units of stripes and for accessing the data in units of fixed length segments, wherein each stripe includes one fixed length segment from each disk of the array. The interface also queues submitted I/O transaction requests so that I/O transactions requested on a current I/O cycle i are not performed until the next I/O cycle i+1. The I/O transactions thus queued are performed in an order which permits a maximum number of I/O transactions to be performed each I/O cycle, regardless of the order in which they were submitted. In addition, the interface also queues the submitted I/O transaction requests so that the completion of an I/O transaction on a current I/O cycle i is not returned until the next I/O cycle i+1. The completions of the I/O transactions thus queued are returned in the order they were submitted regardless of the order in which they were performed. Furthermore, the interface provides a state machine which controls the amount of data accessed each I/O cycle for a corresponding stream. The state machine permits no more than a particular allotted amount of data to be accessed each I/O cycle, wherein the allotted amount of data is selected according to the bandwidth requirement of the corresponding stream.

28 Claims, 17 Drawing Sheets

U.S. PATENT DOCUMENTS

| | | | |
|---|---|---|---|
| 4,888,691 | 12/1989 | George et al. | 395/700 |
| 5,008,819 | 4/1991 | Gorbatenko | 395/287 |
| 5,140,683 | 8/1992 | Gallo et al. | 395/444 |
| 5,197,143 | 3/1993 | Lary et al. | 395/309 |
| 5,218,695 | 6/1993 | Noveck et al. | 395/621 |
| 5,220,653 | 6/1993 | Miro | 395/826 |
| 5,261,072 | 11/1993 | Siegel | 395/842 |
| 5,263,145 | 11/1993 | Brady et al. | 395/441 |
| 5,301,297 | 4/1994 | Menon et al. | 395/441 |
| 5,331,417 | 7/1994 | Soohoo | 348/584 |
| 5,339,449 | 8/1994 | Karger et al. | 395/700 |
| 5,440,683 | 8/1995 | Nally et al. | 395/162 |
| 5,446,855 | 8/1995 | Dang et al. | 395/401 |
| 5,448,315 | 9/1995 | Soohoo | 348/722 |
| 5,455,934 | 10/1995 | Holland et al. | 395/404 |

OTHER PUBLICATIONS

Network and Operating Systems Support for Digital Audio and Video, 12 Nov. 1992, La Jolla, CA, USA pp. 56–68 H.M. Vin, "Admission Control Algorithms for Multimedia On–Demand Servers".

Network and Operating Systems Support for Digital Audio and Video, 12 Nov. 1992, La Jolla, CA, USA pp. 69–80 P. Lougher et al. "The Design and Implementation of a Continuous Media Storage Server".

ACM Transactions on Information Systems, vol. 10, No. 1, Jan. 1992, New York, USA pp. 51–90 J. Gemmell et al. "Principles of Delay–Sensitive Multimedia Data Storage and Retrieval" p. 81, line 5 –p. 82, line 8.

IEEE Communications Magazine, vol. 30, No. 7, Jul. 1992, USA pp. 56–74, Rangan, R.V. et al. "Designing an On–Demand Multimedia Service".

13th ACM Symposium on Operating System Principles, vol. 25, No. 5, 13 Oct. 1991, Pacific Grove, CA, USA, pp. 81–94 Venkat Rangan P. et al. "Designing File Systems for Digital Video and Audio".

IEEE Journal on Selected Areas in Communications, vol. 11, No. 1, Jan. 1993, New York, USA pp. 153–164, H.M. Vin "Designing a Multiuser HDTV Storage Server".

Storage & Recording Systems, Scalable Storage Servers for Digital Audio and Video, P. Lougher, D. Pegler, D. Shepherd, pp. 140–143 IEE (1994).

Disk Subsystem Load Balancing: Disk Striping vs. Conventional Data Placement, Gregory R. Ganger, Bruce L. Worthington, Robert Y. Hou, Yale N. Patt, pp. 40–49 IEEE (1993).

Dynamic File Allocation in Disk Arrays, Gerhard Weikum, Peter Zabback, and Peter Scheuermann, pp. 406–415 (1991).

T. Chiueh, et al., "Multi–Resolution Video Representation for Parallel Disk Array's", Proceedings ACM Multimedia '93, Aug. 93, pp. 401–409.

F.A. Tobagi, et al., "Streaming RAID–A Disk Array Management System for Video Files", Proceedings ACM Multimedia '93, Aug. 93, pp. 393–400.

S. Ghanderharizadeh, et al., "An Overview of Techniques to Support Continuous Retrieval of Multimedia Objects", Computer Architecture News, vol. 21, Dec. 1993, pp. 39–46.

E. Chang, et al. "Scalable Video Data Placement on Parallel Disk Arrays", Proceedings SPIE, Storage and Retrieval for Image Video Database II, vol. 2185, Feb. 1994, pp. 208–221.

W. Tetzlaff, et al. "A Methodology for Evaluating Storage Systems in Distributed and Hierarchical Video Servers", COMPCON Spring '94 IEEE Computer Society International Conference.

A.L. N. Reddy, et al., "I/O Issues in a Multimedia System", Computer Magazine, Mar. 1994 vol. 27, IEEE/IEE Publications Ondisc.

Katseff, et al., "On the Synchronization and Display of Multiple Full–Motion Video Streams", pp. 3–9, IEEE.

| SEGMENT n | SEGMENT n |     | SEGMENT n | STRIPE n |
|-----------|-----------|-----|-----------|----------|
| DISK 0    | DISK 1    | ... | DISK n    |          |
| SEGMENT 1 | SEGMENT 1 |     | SEGMENT 1 | STRIPE 1 |
| SEGMENT 0 | SEGMENT 0 |     | SEGMENT 0 | STRIPE 0 |

| DISK 0 | DISK 1 |  | DISK n-1 | LAST STRIPE |
|--------|--------|--|----------|-------------|
| DATA STRIPES | DATA STRIPES | ... | DATA STRIPES | STRIPE 3 + (CHAT) |
| DIRECTORY | DIRECTORY |  | DIRECTORY | STRIPE 2 + (CHAT) |
| CHAT | CHAT |  | CHAT | STRIPE 1 + (CHAT stripes) <br> STRIPE 1 |
| DISK LABEL | DISK LABEL |  | DISK LABEL | STRIPE 0 |

FIG. 18A

| EVENT | ACTION | OUTPUTS | NEXT STATE |
|---|---|---|---|
| READ | if (curbytes < 0)<br>{<br>  ios needed = -curbytes / segment size;<br>  if (group's temp IOs > ios needed)<br>  {<br>    subtract ios needed from group temp IOs;<br>  }<br>  else<br>  {<br>    ios needed = group temp IOs;<br>    group temp IOs = 0;<br>  }<br>  curbytes = -(ios needed * segment size);<br>  the rest is the same as PREREAD<br>  state transition;<br>} | see PREREAD READ event state transition | see PREREAD READ event state transition |
| WRITE | same as PERIODIC WRITE state WRITE event state transition | see PERIODIC WRITE state WRITE event state transition | see PERIODIC WRITE state WRITE event state transition |
| CYCLE | nothing | SUCCESS | IDLE state |

FIG. 18B

| EVENT | ACTION | OUTPUTS | NEXT STATE |
|---|---|---|---|
| READ | call array manager read function with<br>    completion ref = I/O desc's completion ref<br>    stripe = I/O desc's stripe number<br>    segment = I/O desc's segment number<br>    read type = high-priority aperiodic<br>    gather desc = I/O desc's gather desc<br>    request tag = pointer to I/O descriptor;<br>enqueue I/O descriptor on queue head pointed to<br>    by I/O desc's submit queue back pointer;<br>add segment size to current bytes submitted;<br>increment open desc's startup io count;<br>if (curbytes >= limitbytes)<br>{<br>    add open desc's startup io count to open desc's<br>       total io count;<br>    startup io count = 0;<br>} | READ AGAIN if curbytes < limit bytes;<br><br>WAIT if curbytes >= limit bytes; | PREREAD if curbytes < 0;<br><br>GORGED READ if curbytes >= limit bytes;<br><br>PERIODIC READ if curbytes >= 0; |
| WRITE | complain bitterly | ERROR | ERROR |
| CYCLE | add open desc's startup io count to total io count;<br>startup io count = 0;<br>curbytes = 0; | READ AGAIN | PERIODIC READ |

FIG. 18C

| EVENT | ACTION | OUTPUTS | NEXT STATE |
|---|---|---|---|
| READ | I/O descriptor's I/O type = "PERIODIC";<br>enqueue I/O descriptor on group's periodic pending queue;<br>add segment size to curbytes;<br>increment total io count; | READ if total io count <= io threshold<br><br>WAIT if total io count > io threshold | PERIODIC READ if curbytes < limit bytes<br><br>GORGED READ if curbytes >= limit bytes; |
| WRITE | complain bitterly | ERROR | ERROR |
| CYCLE | subtract limit bytes from curbytes;<br>if (curbytes < 0)<br>{<br>    log the fact that the stream is underrunning due<br>       to not submitting enough buffer;<br>    curbytes = 0;<br>} | SUCCESS | PERIODIC READ |

FIG. 18D

| EVENT | ACTION | OUTPUTS | NEXT STATE |
|---|---|---|---|
| READ | nothing | return "GORGED", causing the calling process to block on the open descriptor's gorge semaphore | GORGED READ |
| WRITE | complain bitterly | ERROR | ERROR |
| CYCLE | subtract limit bytes from curbytes; signal open descriptor's gorged semaphore; | SUCCESS | PERIODIC READ |

FIG. 18E

| EVENT | ACTION | OUTPUTS | NEXT STATE |
|---|---|---|---|
| READ | complain bitterly | ERROR causing the calling process to block on the open descriptor's gorge semaphore | ERROR |
| WRITE | enqueue i/o descriptor on group's periodic pending queue add segment size to curbyte | SUCCESS | PERIODIC WRITE if curbytes < limitbytes<br><br>GORGED WRITE if curbytes >= limitbytes |
| CYCLE | if (curbytes > max bytes)<br>{<br>    max bytes = curbytes;<br>}<br>curbytes = 0; | SUCCESS | PERIODIC WRITE |

FIG. 18F

| EVENT | ACTION | OUTPUTS | NEXT STATE |
|---|---|---|---|
| READ | complain bitterly | ERROR | ERROR |
| WRITE | nothing | return "GORGED", causing the calling process to block on the open descriptor's gorge semaphore | GORGE WRITE |
| CYCLE | maxbytes = limitbytes; curbytes = 0; signal open descriptor's gorge semaphore | SUCCESS | PERIODIC WRITE |

FIG. 18G

| EVENT | ACTION | OUTPUTS | NEXT STATE |
|---|---|---|---|
| READ | complain bitterly | ERROR | ERROR |
| WRITE | complain bitterly | ERROR | ERROR |
| CYCLE | complain bitterly | ERROR | ERROR |

METHOD FOR ACCESSING ONE OR MORE STREAMS IN A VIDEO STORAGE SYSTEM USING MULTIPLE QUEUES AND MAINTAINING CONTINUITY THEREOF

RELATED APPLICATIONS

The following applications are assigned to the same assignee as the present application and contain subject matter related to the subject matter of the present invention:

1. U.S. patent application Ser. No. 07/977,493 entitled "Method of Operating a Disk Storage System" filed for Fouad A. Tobagi, Joseph M. Gang, Jr., Randall B. Baird, Joseph W. M. Pang, and Martin J. McFadden on Nov. 17, 1992, U.S. Pat. No. 5,581,784, issued Dec. 8, 1996;

2. U.S. patent application Ser. No. 08/082,227 entitled "Video Application Server" filed for James E. Long, Joseph M. Gang, Jr., Charles J. Bedard, Randall B. Baird, and David A. Edwards on Jun. 24, 1993; and U.S. Pat. No. 5,550,982, issued Aug. 27, 1996

3. U.S. patent application Ser. No. 08/246,220 entitled "Method for Operating an Array of Video Storage Units" for Fouad A. Tobagi, Randall B. Baird, Joseph M. Gang, Jr., and Joseph W. M. Pang filed on May 19, 1994.

The above-listed applications are incorporated herein by reference.

FIELD OF THE INVENTION

The present invention relates to a video storage system. In particular, the present invention relates to an interface for processing requests to read and write data of video, audio, multimedia, or other time-based streams submitted by video applications and the physical reading and writing of the data of those streams by the video storage system. The interface according to the invention maintains the continuity of the video streams and also maximizes the number of simultaneous video streams accesses which may be supported by the video storage system. The invention is applicable to supporting streams on a local area network, wide area network or on a stand-alone system wherein a video storage system is accessed to retrieve or store data belonging to a plurality of streams. For example, in the stand-alone system, the streams may be retrieved from the video storage system for display locally on a monitor or received from an external source for storage in the video storage system.

BACKGROUND OF THE INVENTION

One application of the inventive method for operating a disk storage system is in a network such as a local area network.

A Local Area network (LAN) for handling video data is illustrated in FIG. 1. The network 10 comprises a shared transmission medium 12 and a plurality of stations 14 connected to the shared transmission medium 12. In addition, a server 16 is connected to the shared transmission medium 12. A video storage system 20 for storing a plurality of video files is connected to server 16. Illustratively, the video storage system 20 is a disk storage system. However, other types of storage systems may be used such as tape decks, laser disks, CD ROMs, etc. A plurality of the stations 14 typically wish to access the disk storage system 20 simultaneously to retrieve video files stored in the disk storage system 20 or to write video files into the disk storage system 20. As indicated above, the invention is also applicable to a stand-alone system wherein a disk storage system is accessed to retrieve streams for display on a local monitor or a disk storage system is accessed to store streams received from an external source.

Streaming data differs from transactional data as follows. With transactional data applications, the data rate associated with the traffic source is highly variable, i.e, it exhibits a high peak-to-average ratio. In contrast, the data rate associated with the transmission of a stream is relatively constant and is generally higher than the average rate associated with a transactional source.

In stream oriented applications such as video, the process according to which data is produced by a source (e.g., a disk storage system) and consumed by a destination (e.g., a decoder at an end-user station) is relatively continuous and steady. As far as the storage system is concerned, two distinct but similar operations are of interest: (i) the recording of streams produced by sources in which case the storage system is the consumer, (ii) the playback of previously recorded stream-oriented files in which case the storage system is the source. These processes are schematically illustrated in FIG. 2. FIG. 3 illustrates the consumer/producer paradigm in the network environment wherein disk producer and disk consumer processes are provided for producing and consuming outgoing and incoming streamed data in the network.

The storage requirements for streaming data such as video and multimedia data are different than the storage requirements for typical LAN data which is transactional in nature. The size of the files is an order of magnitude greater or more. Even with compression techniques, the physical storage needs are large. While laser disks and CD ROMs provide cost effective storage, they are awkward for providing simultaneous access to multiple users. A preferred storage medium for video files is the magnetic disk storage system.

A magnetic disk storage system 20 is illustrated in FIG. 4. The disk storage system 20 comprises a plurality of disk drives 200. Each disk drive 200 comprises a disk 21 and a controller 210. The disk drive 200 is shown in greater detail in FIG. 5. As shown in FIG. 5, the disk 21 of the disk drive 200 comprises a plurality of platters 22. Each platter 22 has one or two magnetic surfaces, a bottom surface 23 and/or a top surface 24, for recording. Associated with each recording surface 23 or 24 is a read/write head 26. In the disk 21 of FIG. 5, let h denote the number of heads, and thus, usable surfaces. The heads 26 are moved to particular locations on the platter surfaces 23,24 by the actuator 28 which is controlled by a controller 210. Thus, the controller 210 controls the proper positions of the read/write heads 26 and the transfer of data in both directions between the magnetic surfaces and a local buffer 30 which forms part of the controller 210. The controller 210 also manages the transfer of data across the SCSI bus 220 (see FIG. 4) into and out of a buffer internal to the adapter 230. The adaptor 230 is then in charge of the transfer of data, via the system bus 250, into and out of the server computer system 16 which includes the memory of 260, CPU 270, and network interface 280. In the case of a stand-alone system, the computer system 16 may not be a server and may not include a network interface.

As shown in FIG. 6, each recording surface 23, 24 is divided into a number of concentric tracks. Tracks on all surfaces, which are located at the same radius, form a cylinder. The number of tracks in a cylinder is thus equal to h. Let c denote the number of tracks per surface (and thus also the number of cylinders), and consider the tracks (and thus cylinders) to be numbered sequentially 1, ... ,c, starting with the outer track (cylinder). Each track is divided into a number of fixed size sectors. Due to the circular geometry of the surface, the number of sectors in a track is not the same for all tracks; there being more sectors in outer tracks than in inner tracks.

As shown in FIG. 7, the cylinders in the disk are divided into subsets of contiguous cylinders called zones, such that the number of sectors per track in a zone is the same for all tracks in the zone. We let Z denote the number of zones, and consider the zones to be numbered sequentially from 0 to Z-1 starting with the outer zone on the disk. In FIG. 7, the number of sectors in a track of zone i is designated $\sigma_i$ and the number of cylinders in zone i is designated $k_i$. Note that not all disks are organized into zones.

The disk rotates permanently at a constant speed of R rotations per minute, and the read/write heads are moved all together from one cylinder to another, as needed. All I/O transactions are for an integral number of sectors, the specific number of which depends on the application. To limit the overhead caused by head movement when writing or reading a block of data, the sectors on the disk are used consecutively and sequentially, going from sector to sector on a given track, from track to track in a given cylinder, and from cylinder to cylinder.

An example of a disk drive is the HP C2240 drive which has h=13 read/write heads, a total of c=2051 cylinders, and a rotational speed of R=5400 rotations/minute. The 2,051 cylinders comprise 1981 data cylinders, 69 spares, and one for logs and maintenance information. They are organized into eight zones.

When a request for an I/O operation is placed in the disk storage system (say a read or write operation for some number of consecutive sectors), the heads are first moved to the cylinder where the first sector is located; the delay incurred in this operation is referred to as the seek time ($X_{seek}$). The head corresponding to the appropriate track then waits until the first sector appears under it, incurring a delay referred to as the rotational latency ($X_{ro}$). Once the first sector is located, the head begins reading or writing the sectors consecutively at a rate determined by the rotational speed; the time to read or write all sectors constituting the block is referred to as the transfer time ($X_{transfer}$). Note that if the block of data spans sectors located on more than one track in a given cylinder, then a switch from one head to the next is made at the appropriate time, thus incurring a so-called head switch time. If the block spans sectors located on multiple cylinders, then a head movement from one cylinder to the next takes place, thus incurring a track-to-track seek time each time this occurs. Accordingly, in performing an I/O operation, a certain amount of time is required. To asses the performance of a disk supporting an application, an analysis of the time required in each transaction must be undertaken.

The total time required in performing a read or write operation for a block $T_{I/O}$(block), is the sum of seek time, rotational latency, and transfer time.

$$T_{I/O}(block) = X_{seek} + X_{ro} + X_{trans}$$

FIG. 8 shows how the total time $T_{I/O}$ for a block is divided into, seek time, rotation latency, and transfer time. As shown in FIG. 8, the transfer time includes some head switch times and/or track-to-track seek times. It should be noted that seek times, rotational delays and transfer times may be random and not known a priori.

Note that to obtain the total time required to transfer the data into the system's memory, one should also account for any additional time that may be incurred in contending for the SCSI bus, in transferring the data from the controller's buffer to the system's memory. However, as these operations take place to a large degree simultaneously with the transfer of data off the disk into the controller's memory, such additional delay is negligible and may be ignored. In some types of disk controllers that cannot handle overlapped communication with the host and transfer off of the disk, the delay is significant. The invention can work with these less efficient disk subsystems, but at a significant performance penalty.

The most important requirement on the storage system in supporting an active stream is to maintain the continuity of the stream.

U.S. patent application Ser. Nos. 07/977,493 and 08/246, 220 disclose different arrangements of physically stored data of video, audio, or other time-based streams in a video storage system. These applications also describe methods for accessing the video streams in a cyclical fashion. In particular, I/O cycles are defined having a particular fixed length, e.g., $Nd \cdot S/W_{base}$ where S is the size of the video segments to be stored or retrieved, $W_{base}$ is the base rate at which video streams are produced or consumed and $N_d$ is the number of disks. A particular number of I/O transactions (reads or writes) are performed during each I/O cycle including one I/O transaction for each active stream in each disk. I/O transactions are performed at a much higher rate than the corresponding consumption or production by the video applications. For instance, during a single I/O cycle, enough data may be read for consumption by several video applications during the entire next I/O cycle. Likewise, during a single I/O cycle, the video storage system can write all of the data produced in one I/O cycle by each of several video applications.

These patent applications also disclose that I/O transactions need not be performed in the order they are received. Rather, the I/O transactions of each I/O cycle may be reordered to increase the number of I/O transactions which may be supported each I/O cycle. In particular, I/O transactions are illustratively sorted so that the movement of the disk heads is minimized. This sorting is possible due to the aforementioned cyclical scheduling of I/O transactions.

It is an object of the present invention to provide an interface for receiving I/O transaction requests from video applications, for causing the video storage system to read or write data in accordance with these I/O transaction requests, and for returning completed I/O transaction to their corresponding requesting video applications. It is a further object to provide an interface which performs all of these functions according to the above described cyclic scheduling.

SUMMARY OF THE INVENTION

The present invention provides a method for interfacing video, audio, multi-media, or other time-based stream applications with a video storage system. The interface provides a method of organizing the video storage system which facilitates storage and retrieval of stream-oriented data. Furthermore, the interface provides functions and data structures for accessing stream-oriented data in a cyclic fashion. Each of these features is discussed separately below.

Video Storage System Organization

Illustratively, the video storage system includes an array of $N_d$ disks. The storage locations of the disk may be divided into segments wherein each segment has a constant number of data blocks. In accordance with the present invention, the segments of the disks are organized into sets called stripes.

Video streams are stored on the disks in data elements called chunks. Chunks are allocated storage space on the video storage system in units of stripes but are accessed in units of segments. The list or sequence of stripes associated with a chunk is accessed in sequential order.

A special table called the chunk allocation table (CHAT) is provided for keeping track of the stripes. There is one CHAT table entry for each stripe of the disk array. The table entry, among other things, defines the sequence of stripes that control storage for a particular chunk. By a priori knowing the index of the first stripe in a chunk, all stripes in the chunk can be located by following an index to the next stripe which is contained in each table entry. The CHAT also maintains a list of stripes which are not yet allocated called the free list.

Interface Scheduling

The interface provides functions and data structures for scheduling I/O transactions in a cyclic fashion. Before discussing the functions and data structures, the processes which access those functions and data structures are described. (Herein, a "process" is a locus of execution that executes independently from other processes.)

Processes Which Execute Functions of the Interface

According to the invention, the following processes can execute functions of the interface:

(1) Client Processes: These are processes which desire to access streams. Client processes submit requests to read data from or write data to a chunk, and wait to receive data read from a chunk. In a stand-alone system, the is client processes may be the video stream applications themselves. In a network environment, a disk producer or consumer process serves as the client process. See U.S. Patent application Ser. No. 08/082,227.

(2) Cycle daemon: This process is spawned by the interface and is responsible for the cyclical nature of the I/O transaction execution. Essentially, the cycle process wakes up once each time an I/O cycle time expires and initiates the next I/O cycle.

Unitization of Executed Functions

The functions executed by the above processes and hardware are organized into related groups called units. Only particular exported functions and data structures of each unit may be accessed by the processes and hardware. Other internal functions and data structures are not directly accessible to the above processes and hardware. The units supported by the interface according to the present invention include:

(1) Streaming RAID™ manager unit: This unit provides functions for allocating and deallocating resources for performing I/O transaction requests on chunks. Furthermore, the Streaming RAID™ manager unit contains functions for receiving I/O transaction requests for chunks and for submitting those transactions request for performing on the appropriate I/O cycle or subcycle. The Streaming RAID™ manager unit also returns the completion of the I/O transactions in the order in which they were submitted. This unit contains all of the functions which may be executed by client processes.

(2) Disk manager unit: This unit contains functions for physically performing the submitted I/O transactions using the disk subsystem. The disk manager unit ensures that requests to perform I/O transactions submitted during a current I/O cycle i (or subcycle i) are performed during the next I/O cycle i+1 (or subcycle i+1). The I/O transactions need not be performed in the order they were submitted. Rather, they are performed in an order which maximizes the number of I/O transaction which can be performed each I/O cycle (subcycle).

The Streaming RAID™ manager unit provides functions and data structures for receiving requests to perform I/O transactions during a current I/O cycle (subcycle) i. These I/O transactions can be submitted by a plurality of client processes to retrieve data for a plurality of streams. Regardless of which stream the request applies to, the functions enqueue a descriptor data structure for each submitted I/O transaction request in a queue associated with the current cycle (subcycle). At the start of the next cycle (subcycle) i+1, the cycle daemon dequeues each descriptor from the above mentioned queue, uses the information in the descriptor to submit an I/O transaction request to the disk manager, and places the descriptor on a second queue associated with the stream for which the I/O transaction request was submitted. When each client process wishes to retrieve the results of the completed I/O transaction request, they may be retrieved from the appropriate stream queue and only in the order therein. This ensures that the completions of I/O transactions submitted on a cycle i are not retrieved until the cycle i+1. Furthermore, this ensures that I/O transaction completions are retrieved in the order in which the I/O transaction requests were submitted, regardless of the order in which they were completed.

The disk manager unit provides functions and data structures for receiving I/O transaction requests during a current cycle (subcycle) i. The disk manager functions enqueues a descriptor data structure for each command to perform the I/O transaction of each submitted request onto an inactive queue. The descriptors are enqueued onto the inactive queue in an order which maximizes the number of I/O transactions which can be performed each I/O cycle (subcycle). For instance, the descriptors may be enqueued in ascending order of starting block which must be accessed in order to minimize disk head movement. At the start of the next cycle (subcycle) i+1, the cycle daemon switches the inactive queue and an active queue (so that the enqueued descriptors are now in the active queue and a new, empty inactive queue is ready for more I/O transactions). The video storage system executes only the commands for performing the I/O transactions of the descriptors in the active queue. Furthermore, the commands are transferred to the video storage system in the order therein. This ensures that commands for performing I/O transactions requests submitted on a cycle i are not performed until the cycle i+1. Furthermore, the commands are submitted to the video storage system in an order which maximizes the number of I/O transactions which may be performed each cycle, regardless of the order in which they were submitted.

The Streaming RAID™ manager unit also provides a state machine function for each stream of data being accessed from one or more chunks. Each state machine has a number of states including, an idle state, a periodic I/O transaction state (e.g., a periodic read, periodic preread or periodic write state) and a gorged state (e.g., a gorged read or gorged write state). Each state machine is responsive to a number events including, a cycle event (which is caused by the cycle daemon once each cycle in the course of initiating a cycle), and a corresponding I/O transaction event (i.e., read or write event). In response to a client process allocating resources for performing I/O transactions, the state machine transitions to the idle state. In response to an I/O transaction event, the state machine can transition to the periodic I/O transaction state. The corresponding I/O transaction can only be performed while the state machine is in this state. In response to performing I/O transactions for an allotted amount of data for a particular I/O cycle, the state machine transitions from the periodic I/O transaction state to the gorged state. Illustratively, the state machine remains in the gorged state thereby preventing further I/O transactions from occurring until the next cycle event. In response to the next cycle event, the state machine transitions back to the periodic I/O transaction state. The state machine, based on the current state, also informs the client processes whether they should wait for submitted I/O transactions to complete or submit more I/O transaction requests.

The state machine ensures that I/O transactions for only an allotted amount of data are performed each I/O cycle. Thus, client processes need not keep track of whether or not they have performed too many I/O transactions for a given bandwidth stream each I/O cycle.

In short, an interface is provided which receives I/O transaction requests from client processes and returns completed I/O transactions thereto. The interface also queues I/O transactions for execution by the disk subsystem and causes the disk subsystem to execute those transactions in a cyclical fashion.

BRIEF DESCRIPTION OF THE DRAWING

FIGS. 18(a), (b), (c), (d), (e), (f) and (g) illustrate state transition tables of the state machine of FIG. 16.

DETAILED DESCRIPTION OF THE INVENTION

Figure 1:
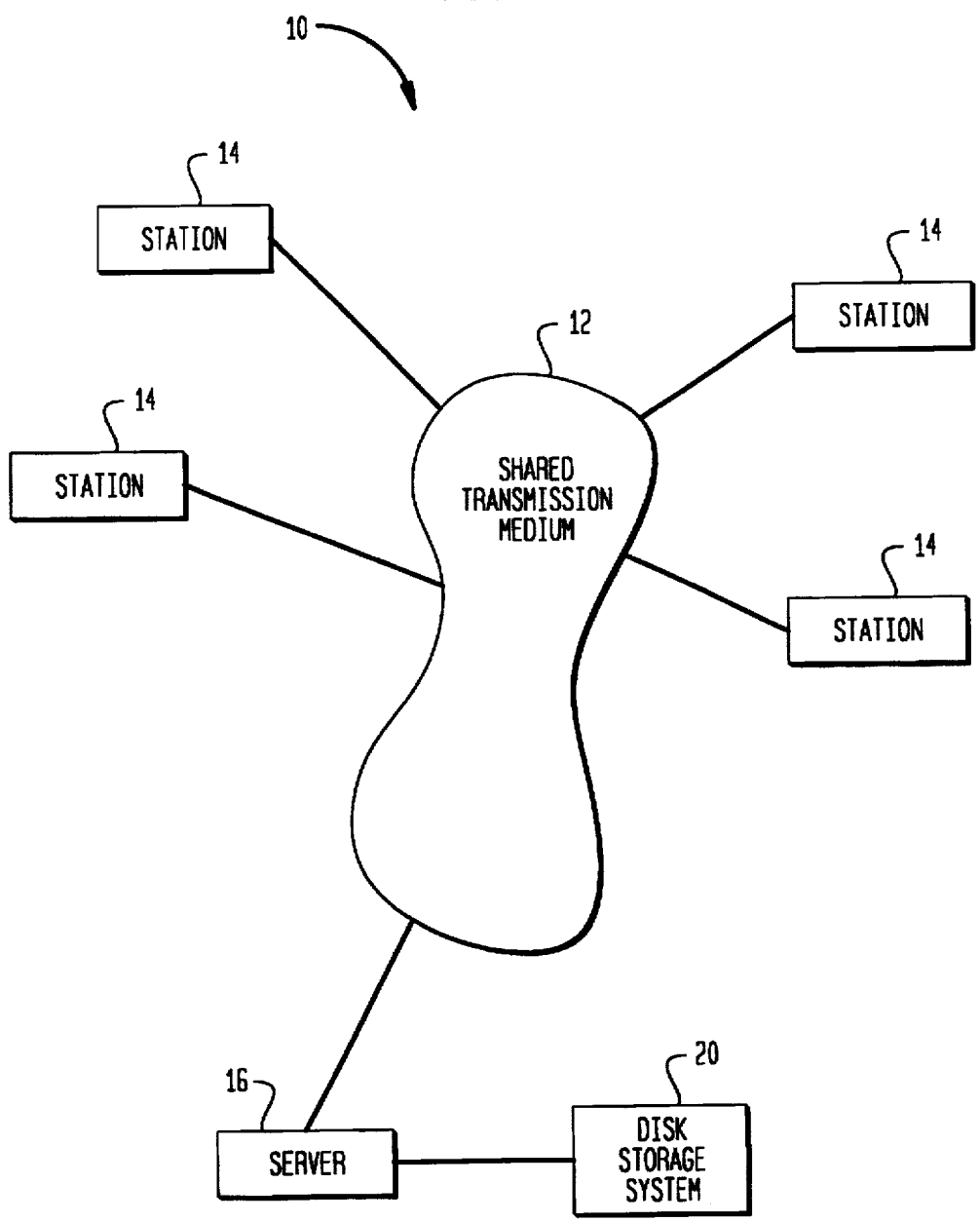
FIG. 1 schematically illustrates a local area network comprising a server, disk storage system, transmission medium and a plurality of end-user stations.
Figure 2:
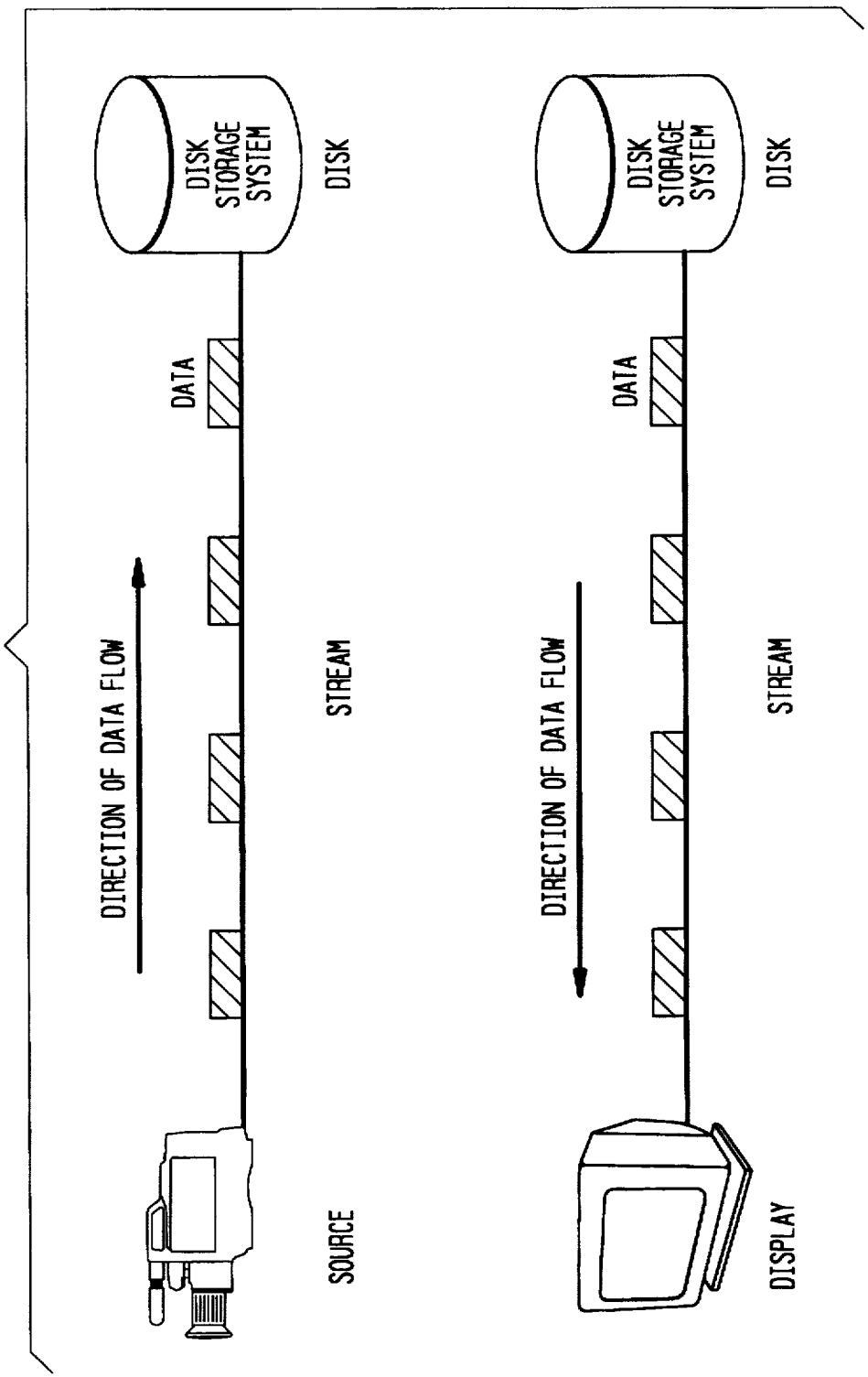
FIG. 2 and FIG. 3 illustrate the production and consumption of data by a video storage system.
Figure 3:
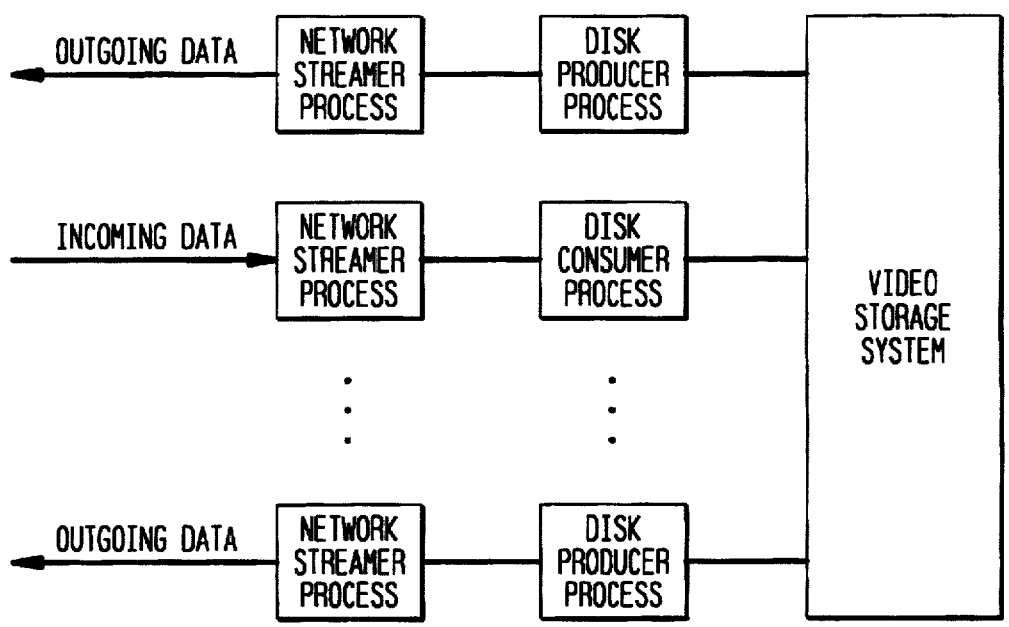
Figure 4:
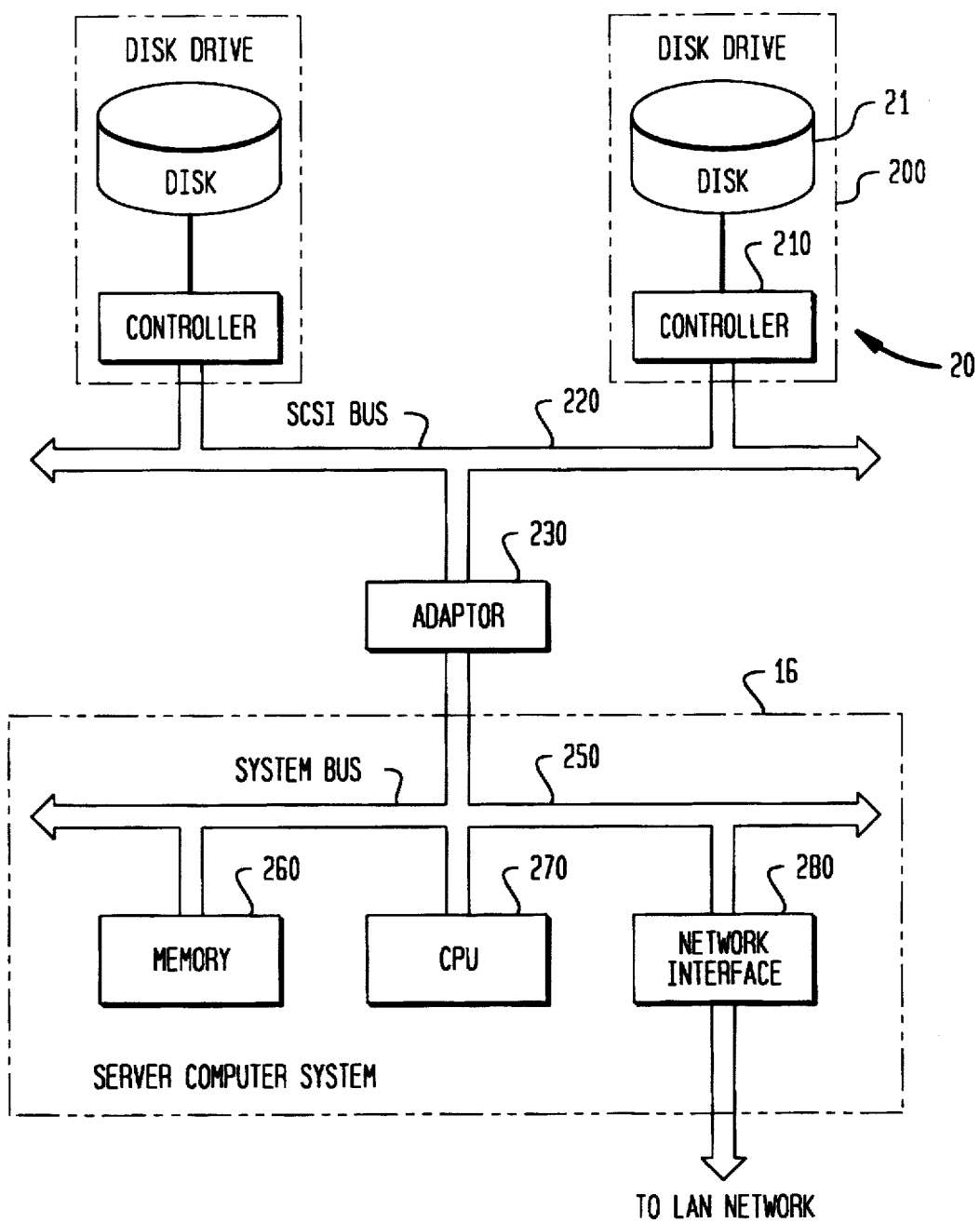
FIG. 4 illustrates a disk storage system.
Figure 5:
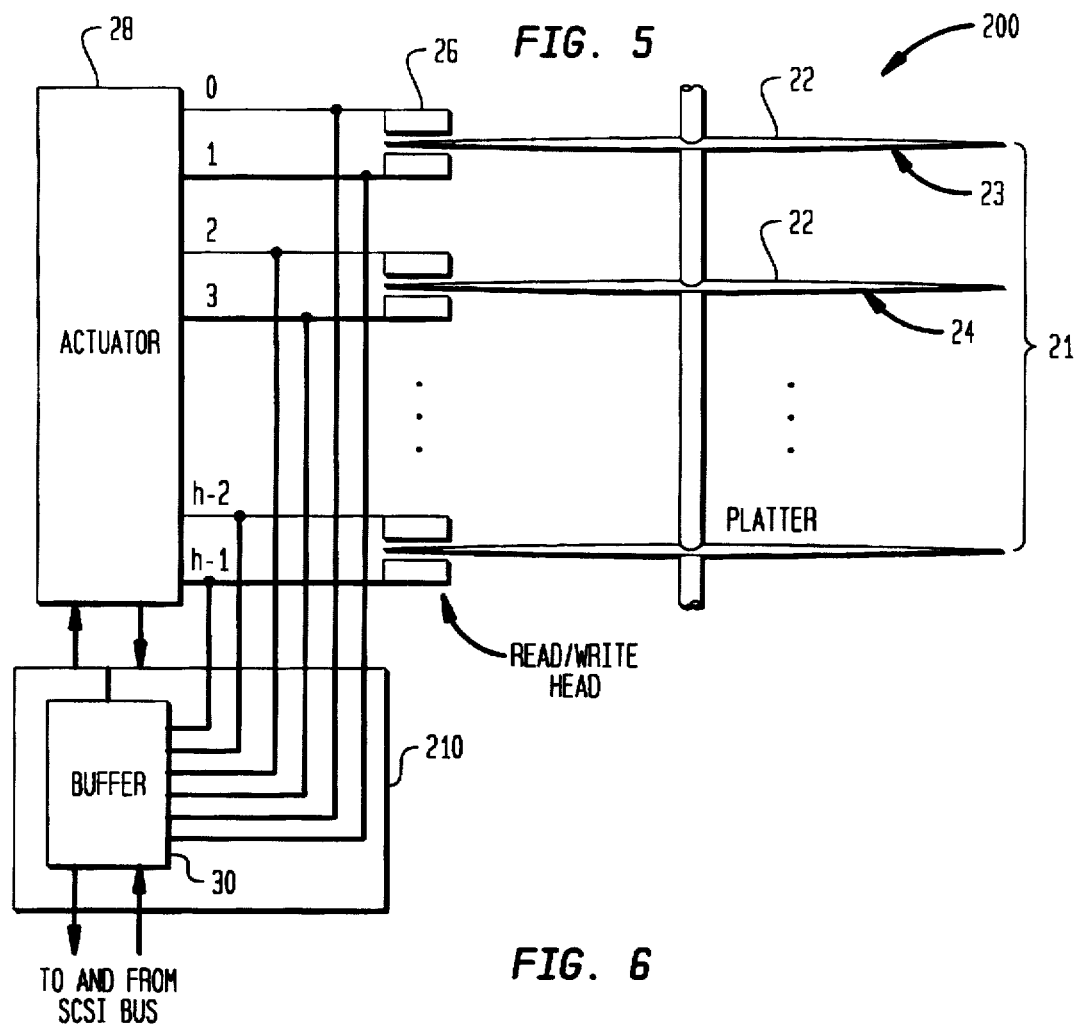
FIG. 5 illustrates one disk drive in the storage system of FIG. 4.
Figure 6:
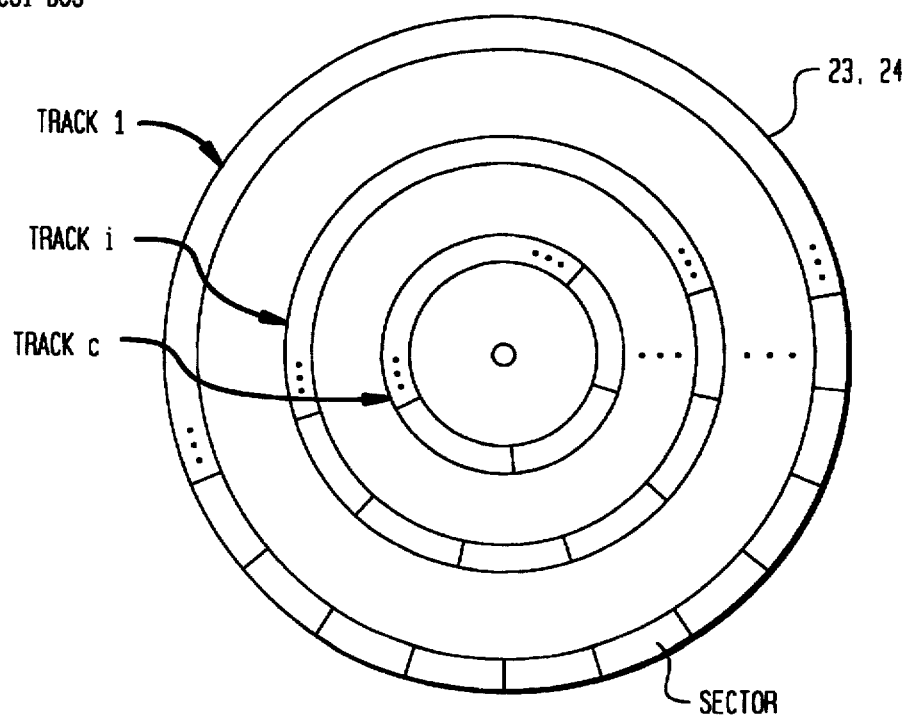
FIG. 6 illustrates the surface of a platter in the disk drive of FIG. 5.
Figure 7:
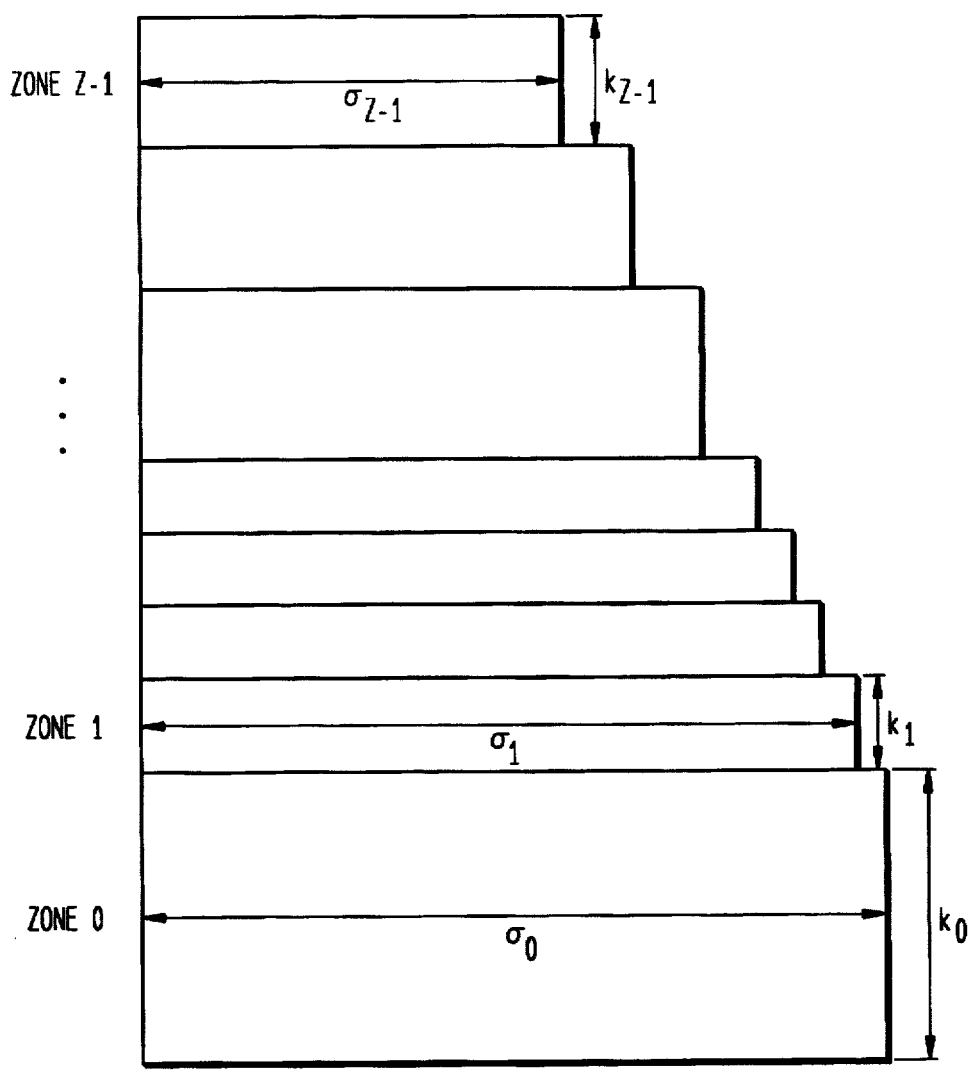
FIG. 7 illustrates how the surface of a platter is organized into zones.
Figure 8:
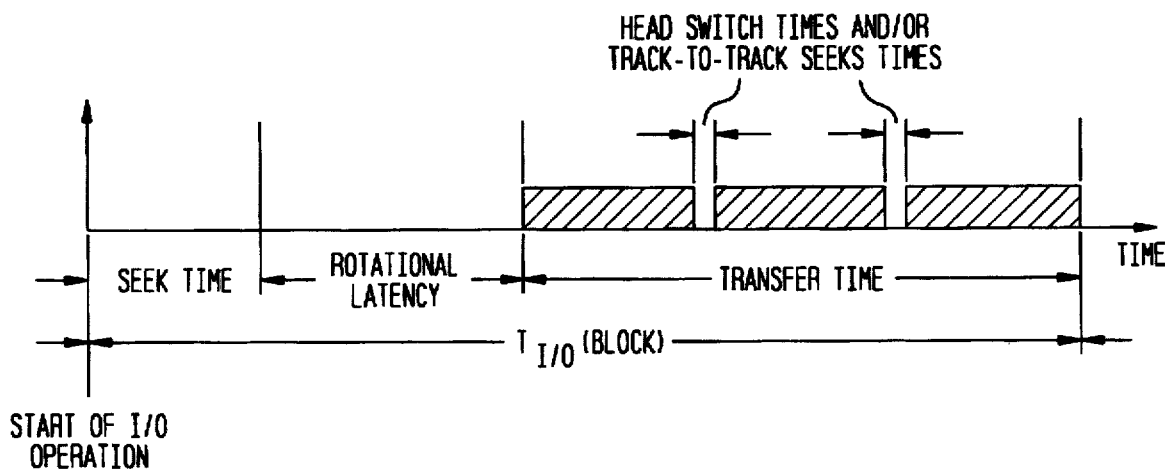
FIG. 8 illustrates the overhead time ($T_{I/O}$) for an I/O transaction in the disk storage system of FIGS. 4 and 5.

In accordance with an illustrative embodiment, the present invention provides a system and method for interfacing video stream applications and a video storage system. The system and method are described in an article entitled R. Baird, "Streaming RAID™ Implementation Description," (hereinafter "BAIRD"). This article is attached to this application as Appendix A and is incorporated herein by reference. Illustratively, the interface according to the present invention may be implemented with software which is executed by the CPU 270 of the server computer system 26 and the disk subsystem, i.e., the adapter 230 and controller 210 as shown in FIG. 4. In the case of a stand-alone system deployment, the interface may be implemented as software which is executed by the CPU and disk subsystem of the stand-alone system.

Below, the scheduling of I/O transactions in cycles and subcycles is reviewed in order to provide an understanding of the goal achieved by the inventive interface. The organization of the video system is then discussed. Then, the processes and hardware which execute functions of the interface, and the organization of those processes into units, are discussed. Thereafter, specific functions of certain units are discussed. Finally, the operation of the interface is discussed by way of example.

I/O Transaction Scheduling

In accordance with the method described in U.S. patent application Ser. No. 07/977,493, I/O transactions take place in I/O cycles. For streams produced by (i.e., read out of) the disk storage system, the data is consumed by the network in consumption cycles which follow one another without gaps. For streams produced by the network to be written into the disk storage system, the data is produced in production cycles which follow one another without gaps.

Consider first an example where the video storage system comprises one disk. Each data stream is either produced by the network (e.g., produced by a video coder in the network) at a constant base rate of $W_{base}$ bits per second and consumed by the disk, or produced by the disk and consumed by the network (e.g., consumed by a video decoder in the network) at a constant base rate of $W_{base}$ bits/sec. One I/O transaction is performed for each stream in each of a plurality of successive I/O cycles of duration $S/W_{base}=T_{play}$. In each I/O transaction, a segment of S bits is stored in or retrieved from the disk. Illustratively, $W_{base}=1.25$ Mbits/sec and S=32 Kbytes, so $T_{play}=210$ milliseconds. Recall that $T_{I/O}$, the total time for each I/O transaction ($T_{I/O}=X_{seek}+X_{ro}+X_{trans}$), is much shorter than $T_{play}$ which is the time it takes the network to produce or consume a segment of S bits of a stream.

The number of streams whose continuity can be simultaneously maintained is limited by the number of I/O transactions which can be performed in an I/O cycle of duration $T_{play}$. This depends on the locations of the retrieved and stored segments in the disk (as $T_{I/O}$ for each transaction depends on the location) as well as the order in which the I/O transactions are scheduled.

Two modes of operation can be considered. The first mode of operation, known as the synchronous mode is such that the I/O transactions for the active streams are scheduled in a particular predetermined order in each I/O cycle, but the production or consumption cycles of duration $T_{play}$, in which the data segments of the active streams are produced or consumed by the network are not necessarily aligned with each other.

The second mode of operation is known as the gated operation and is the preferred mode. The present invention is therefore illustrated below by an embodiment which supports the gated mode. The order of I/O transactions for the active streams may vary from one I/O cycle to the next. The advantage of allowing the order of the I/O transactions to vary from I/O cycle to I/O cycle is that the I/O transactions to be performed in an I/O cycle may be sorted according to their locations on the disk so as to minimize the total I/O overhead and maximize the number of streams supported. In order to be able to let the order of I/O's to vary from I/O cycle to I/O cycle, it is important not to allow the consumption of segments fetched in a given I/O cycle to take place earlier than the end of the given I/O cycle or to allow the production of segments to be stored in a given I/O cycle to take place later than the beginning of the given I/O cycle. If consumed (produced) at the earliest (latest) time, then the consumption (production) cycle for a segment fetched (stored) in a given I/O cycle for a given stream would coincide with the following (preceding) I/O cycle. If this is the case for all streams, then the consumption and production cycles for all streams are aligned with each other, as well as with the I/O cycles.

Figure 9:
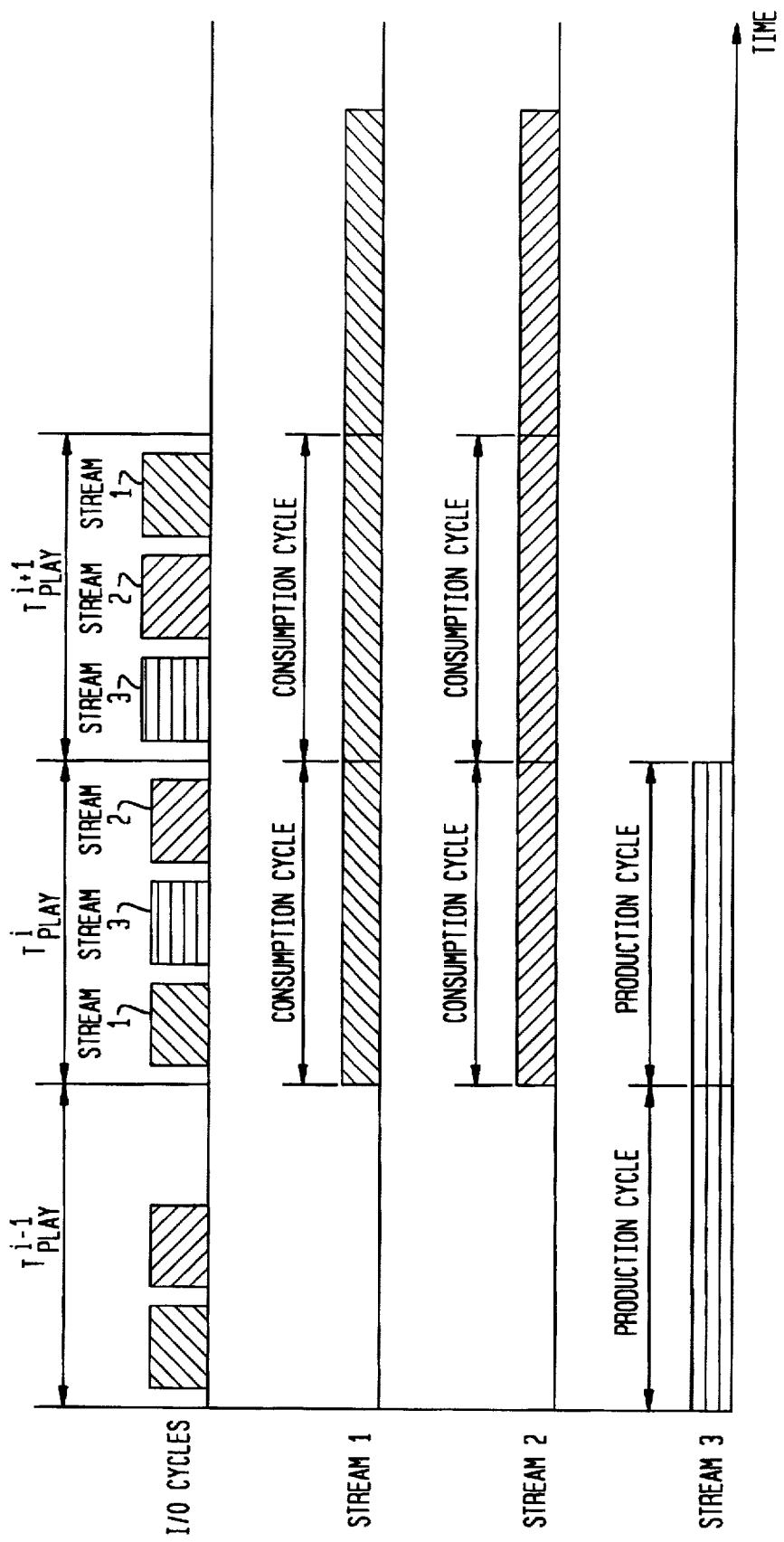
FIG. 9 illustrates one manner of cyclically scheduling I/O transactions.

One way of implementing the gated operation described above is as follows: a sequence of I/O cycles of duration $T_{play}$ is defined, i.e., $T^1_{play}, T^2_{play}, \ldots$. In each cycle $T^i_{play}$, each stream has one I/O transaction. In addition, in each cycle $T^i_{play}$, for each stream, one data segment S is consumed or produced by the network. Segments which are consumed by the disk in cycle $T^i_{play}$ are produced by the network in I/O cycle $T^{i-1}_{play}$. Segments which are produced by the disk in cycle $T^i_{play}$ are consumed by the network in cycle $T^{i+1}_{play}$. FIG. 9 illustrates the I/O cycles of three streams (stream 1, stream 2, and stream 3) and the corresponding consumption and production cycles.

In order to increase the number of streams beyond that which is possible with a single disk, an array of multiple disks may be utilized. The number of disks in the array may be designated by $N_d$.

Figure 10:
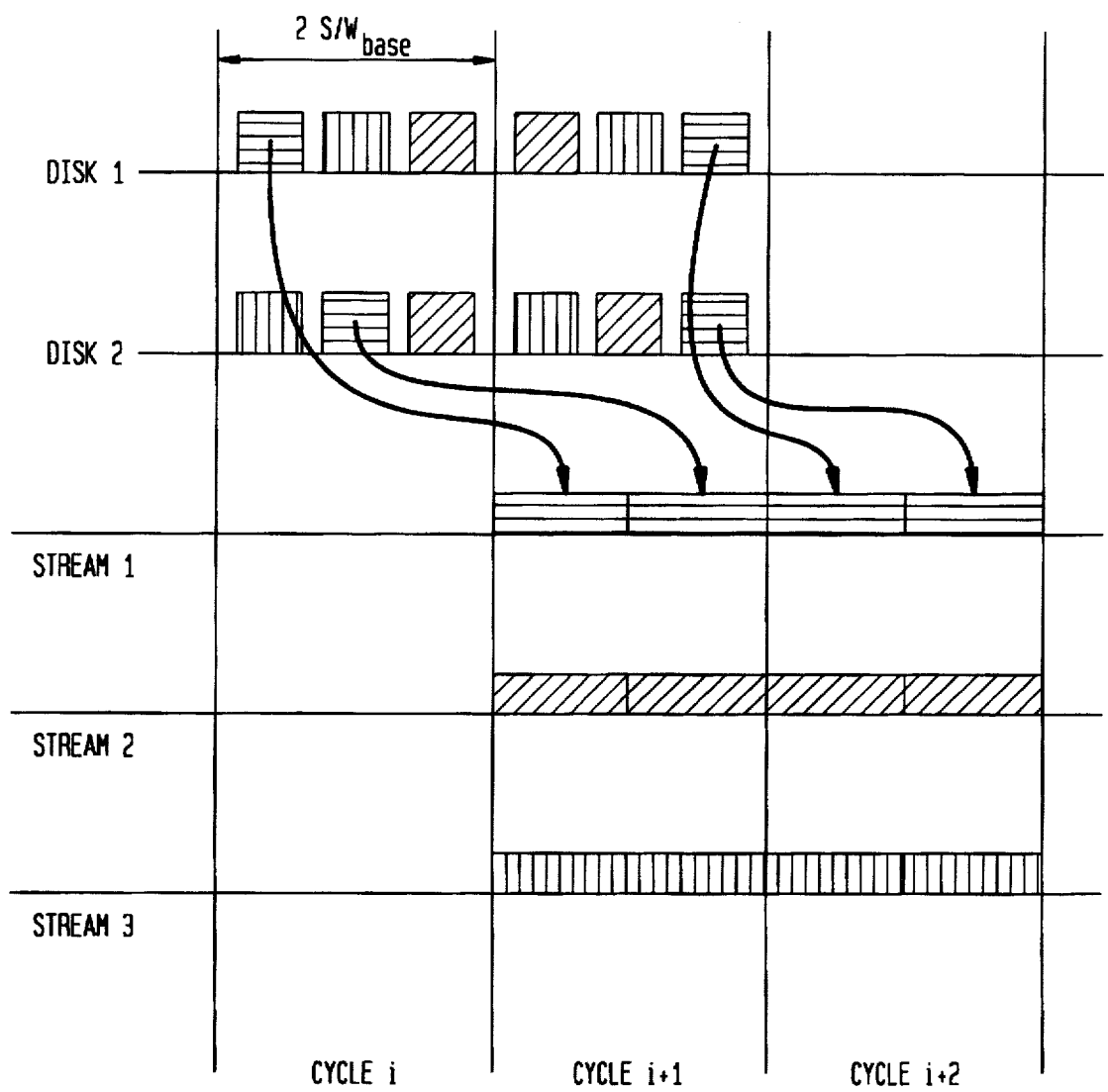
FIG. 10 illustrates a second manner of cyclically scheduling I/O transactions.

Consider an example shown in FIG. 10, wherein the disk array comprises $N_d=2$ disks. Assume also there are three streams (stream 1, stream 2 and stream 3). Each stream has a bit rate $S/W_{base}$, where S is the size of a segment retrieved from a disk and thus, the cycle time is $2S/W_{base}$. Three cycles, cycle i, cycle i+1, and cycle i+2, are shown in FIG. 10. In each cycle, there is one I/O transaction for each stream from each disk, for a total of six I/O transactions per cycle. The order of the I/O transactions for the two disks is different in cycle i and cycle i+1. For example, in cycle i, in disk 1, the order of the I/O transactions is stream 1, stream 3, stream 2 (as indicated by the different shadings used for the different streams). Note that the data for stream 1 fetched in cycle i is consumed in cycle i+1 and the data fetched for stream 1 in cycle i+1 is consumed in cycle i+2. Similarly, the data for stream 2 fetched in cycle i is consumed in cycle i+1, etc.

Figure 11:
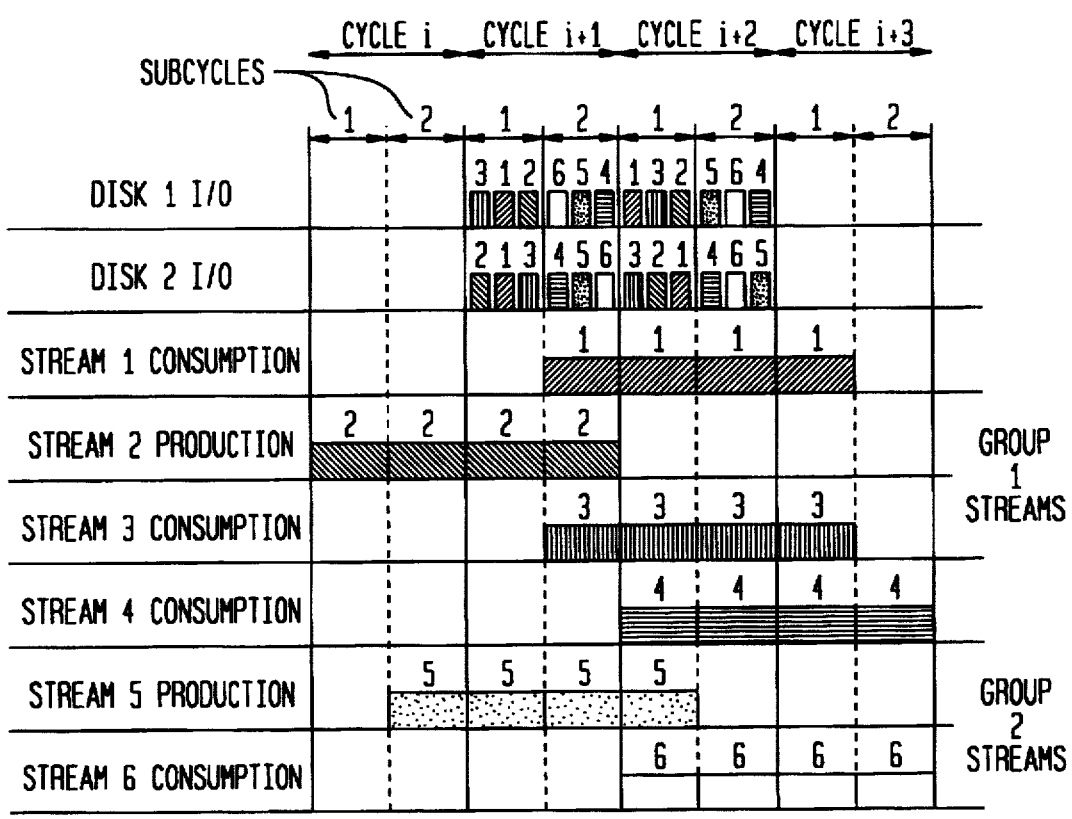
FIG. 11 illustrates a third manner of cyclically scheduling I/O transactions.

An alternate scheduling technique disclosed in U.S. patent application Ser. No. 07/977,493, involves dividing the streams into G groups. The number of streams in each group may be for example $N_{a1}/G$. ($N_{a1}$ is the total number of allowed streams where $N_{a1} \leq N_{max}$). The consumption and production cycles of the streams in each group are time aligned with each other, but the consumption and production cycles of each successive group are offset by one $(1/G)^{th}$ of an I/O cycle of duration $N_dS/W_{base}$. FIG. 11 shows the production and consumption cycles for G=2 groups of 3 streams each, for the case $N_d=2$ disks.

As shown in FIG. 11, the I/O cycle is divided into G subcycles. In each subcycle of length $N_dS/W_{base}G$, the I/O transactions are performed for the group of streams whose production/consumption cycles begin at the end of the particular I/O subcycle. The group of I/O transactions performed in each subcycle is sorted separately, for example, alternating between increasing and decreasing order of cylinders so as to minimize seek overhead. As $N_d=2$, the number of I/O transactions for a stream served in each subcycle is two. For example, as shown in FIG. 11, for a stream in Group 1, which is served in I/O subcycle #1, there is one segment retrieved from each of the two disks. It should be noted that G can be larger than or smaller than $N_d$. This scheduling technique reduces the amount of buffers utilized. It should also be noted that in the operation described above, all disks experience the same load. The implementation of the invention described herein accommodates the division of the I/O cycles into subcycles.

In yet another technique (also disclosed in U.S. patent application Ser. No. 07/977,493) for scheduling I/O transactions in each I/O cycle of duration $N_dS/W_{base}$, the streams are again divided into G groups and the size of each group is again, for example, $N_{a1}G$. I/O transactions are performed in subcycles of length $N_dS/W_{base}G$. However, instead of retrieving or storing $N_d$ segments for each stream in an entire group of size $N_{a1}/G$, there is retrieved or stored one segment for each stream in $N_d$ groups. The segments retrieved or stored are those which begin consumption immediately following the subcycle or which were produced immediately preceding the subcycle. This scheduling technique leads to further reduction in the size of the buffer (e.g., the size of memory 260). In order to keep the load on all disks balanced during each I/O subcycle, it is desirable to guarantee that the segments to be retrieved or stored for each of the $N_d$ groups served in a subcycle come from separate disks.

Video Storage System Organization

Figures 12, 13, 14:
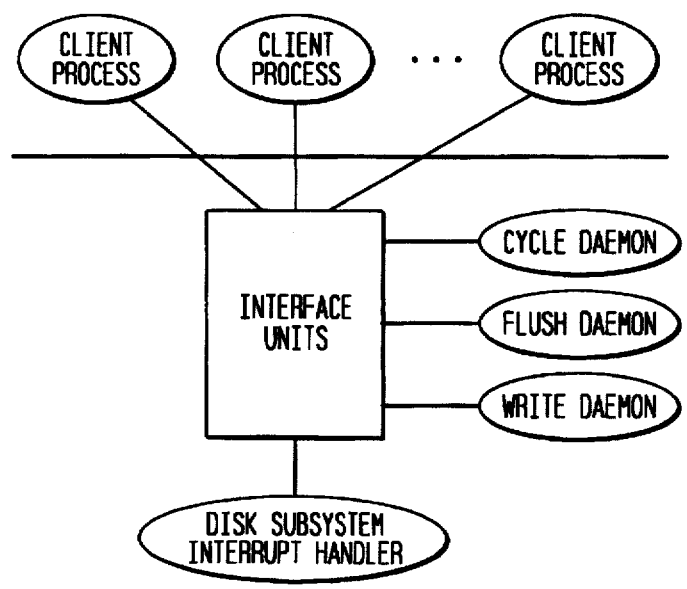
FIG. 12 illustrates the organization of the disk array into stripes.
FIG. 13 illustrates the layout of the CHAT, directory and data areas on the disk array.
FIG. 14 illustrates the relationship of the interface according to one embodiment of the present invention to video stream processes and the disk subsystem.

The video storage system organization is discussed in detail in BAIRD, section 2, pages 1–3. Illustratively, the video storage system is an array of disks. Referring to FIG. 12, n=$N_d$ disks of the video storage system are shown. For simplicity, each disk is assumed to be identical.

As shown, the blocks of the disks are grouped into segments wherein each segment has a constant number of bits S. In FIG. 12, each box for each disk represents a two dimensional array of data blocks. (Illustratively, each block contains 512 bytes and each segment contains 64 blocks or 32 Kbytes.) The segments are grouped together to form stripes. Each stripe includes one segment from each of the $N_d$ disks. Illustratively, the segments of each stripe are located in the same position within their corresponding two dimensional array. However, other stripe configurations are possible as disclosed in U.S. patent application Ser. No. 08/246,220.

Both periodic (cyclic) and aperiodic (non-cyclic) data is stored in the video storage system as data elements called chunks. Storage space in the video storage system is allocated in stripe sized units. However, as discussed in greater detail below, chunk data is accessed in segment sized units. The stripes allocated to a chunk need not be physically adjacent to each other.

A chunk allocation table or CHAT is provided for keeping track of allocated and non-allocated stripes. The CHAT includes an entry for each stripe. Each chunk is allocated a list of stripes in the CHAT called a sequence. There is also a special sequence that contains a list of all stripes not currently allocated to a chunk, called the free list. Each CHAT table entry indicates:

the length of the corresponding stripe;

a set of flags indicating whether the stripe is allocated or not yet allocated, whether the stripe is the first or last stripe in a sequence, and whether the stripe contains a defective disk block; and the index of the CHAT entry for the next stripe in the sequence (If the stripe is part of the chunk, this will be the next stripe in the chunk; if it is free, this will be the next stripe on the free list.)

A directory is also provided for identifying chunks. The directory is contained in a directory chunk stored in the video storage system. Each directory entry corresponds to a particular chunk. The directory entry illustratively contains information such as the CHAT entry of the first stripe of the chunk, the bandwidth requirement for the chunk, etc.

FIG. 13 shows the storage of the CHAT, directory chunk and other chunks in the video storage system. The first stripe is utilized to store the disk label of each disk of the disk array. The CHAT is stored in the video storage system beginning on the very next stripe. The directory chunk is stored beginning with the stripe which immediately follows the last stripe of the CHAT. Other chunks are allocated stripes thereafter.

This organization facilitates I/O transactions in the video storage system. In particular, the allocation of storage space in stripes tends to balance the load over all disks of the disk array. Thus, for a given stream which accesses a particular chunk, the access tends to be evenly distributed over all disks of the array rather than being concentrated in only a single or limited number of disks of the array. The CHAT provides a simple and efficient manner of determining which stripes are allocated and which are available for allocation. Furthermore, the CHAT enables simple sequential access to stripes of a chunk. This is possible by simply examining the CHAT entry for the currently accessed stripe to determine the next stripe in the sequence.

The stripes on the free list are initialized by ensuring that the free list sequence is linked in random order. This ensures that stripes are assigned to chunks in random order, which balances disk load between zones that may have varying transfer rates. By performing this balancing, more I/O transactions can be guaranteed per cycle.

Processes and Hardware which Execute Interface Functions

FIG. 14 pictorially illustrates the relationship between several processes, the video storage system (i.e., the disk storage system) and the interface. First, each of these processes is briefly discussed below. These processes are also discussed in BAIRD, section 5, pages 10–13.

(1) Client processes: These are processes which desire to access streams. Advantageously, the client processes do not have to know too much detail regarding the underlying queuing of I/O transactions or their physical performance by the disk subsystem. Rather, client processes merely "open" (prepare a chunk for access including allocating appropriate resources) and "close" (deallocate resources used in accessing a chunk) chunks. Client processes can also submit requests to read data from, or write data to the chunk, and wait to receive data read from a chunk. In a stand-alone system, the client processes may be the video stream applications themselves. In a network environment, a disk producer or consumer process serves as the client process. In addition to performing the I/O transaction requests for each video stream application, the disk producer or consumer process also maintains the continuity of streams on the network.

(2) Cycle daemon: The cycle daemon is a process which is spawned when the interface is initialized. The cycle daemon intializes each I/O cycle (subcycle), as discussed in greater detail below. Stated generally, the cycle daemon initiates a cycle by enqueuing the appropriate I/O transaction requests for performance by the disk subsystem. The cycle daemon then sets a timer for the duration of the I/O cycle (subcycle) time and waits for the I/O cycle (subcycle) time to expire. The cycle daemon then repeats these steps. In addition, the cycle daemon illustratively can adjust the timer so that the I/O cycle (subcycle) times don't drift, even if exceptional disk conditions cause the I/O transactions for a particular cycle to take longer than a cycle (subcycle.)

(3) Flush daemon: This is another process which is spawned when the interface is initiated. The flush daemon also operates periodically like the cycle daemon but need not be activated as often, or as strictly regularly. The flush daemon writes out stale buffers to the disk subsystem and updates the directory and CHAT from time to time.

(4) Write completion daemon: This is yet another process which is spawned when the interface is initiated. As discussed in greater detail below, when a client process submits a write transaction request, resources are allocated for that request. The client process does not wait for the completion of the write request; it continues other processing. The write completion daemon waits for the completion of each write transaction request and deallocates the resources previously allocated for performing the write transaction.

(5) Disk subsystem (disk driver/disk interface driver): Herein, the disk driver and the disk interface driver (e.g., SCSI-2 driver) are treated as a single apparatus called the disk subsystem. The disk subsystem actually reads and writes data to specific locations on the disk platters. However, the disk subsystem is isolated from the queuing of I/O transactions for performance in a cyclic fashion. Furthermore, the disk subsystem is isolated from the organization of the disk in segments, stripes and chunks. Rather, interface functions are provided for translating references to chunks, stripes and segments to specific disk numbers and disk blocks.

While not strictly a process, the disk subsystem is implemented using hardware separate from the CPU 270 (FIG. 4). The disk manager unit submits requests to the hardware. When the hardware has performed the requested operation, it asynchronously signals the CPU 270 (FIG. 4). This signal typically takes the form of an interrupt, which results in the execution of a piece of software called an interrupt handler. The interrupt handler can be considered to be a separate process.

As shown in FIG. 14, the client processes have no direct access to the disk subsystem. Likewise, the disk subsystem has no direct access to the client processes. Rather, the disk subsystem and client processes can only indirectly access each other via the interface according to the present invention.

Interface Functions and their Organization into Units

As mentioned above, the interface according to the present invention provides functions which may be executed by the client processes, the daemon processes and the disk subsystem. Illustratively, these functions are grouped into units or modules. The unitization of functions is discussed in BAIRD, section 4, pages 9–10. Each unit contains exported functions and data structures which may be accessed by the client processes, daemon processes and disk subsystem. In addition, each unit may also contain internal functions and data structures which are not directly accessible by the client processes, daemon processes or disk subsystem. Rather, the internal functions and data structures are accessed indirectly during the course of executing an exported function. The unitization of the interface functions and data structures permits the client processes, daemon processes and disk subsystem to access only those exported functions and data structures as is necessary to perform I/O transactions as mentioned above.

The units are as follows:

(1) Streaming RAID™ manager unit: This unit provides functions for allocating and deallocating resources for performing I/O transaction requests on chunks.

Furthermore, the Streaming RAID™ manager unit contains functions for receiving periodic (cyclic) and aperiodic (non-cyclic) I/O transaction requests and for submitting to functions of the disk manager unit those I/O transactions requests. The functions of this unit ensures that periodic (cyclic) I/O transaction requests are submitted according to a cyclic schedule. The Streaming RAID™ manager unit also maintains, and returns the completion of, the I/O transaction requests in the order in which they were submitted. The functions and data structures of this unit are discussed in detail in BAIRD, section 6.6, pages 40–61.

(2) Directory manager unit: The functions of this unit pertain to managing the directory chunk. Functions are provided for creating a directory entry, deleting a directory entry, opening a directory entry and closing a directory entry. The functions and data structures of this unit are discussed in detail in BAIRD, section 6.5, pages 38–40.

(3) Stripe allocation manager unit: This unit contains functions for managing the CHAT, for creating and deleting sequences, for locating stripes within sequences and allocating and appending new CHAT entries to existing sequences. The functions and data structures of this unit are discussed in detail in BAIRD, section 6.4, pages 34–37.

(4) Buffer manager unit: This unit contains two subsets of functions. A first subset of functions are provided for allocating and releasing buffers for use in performing periodic (cyclic) I/O transactions. The second subset of functions are for managing all aperiodic (non-cyclic) I/O transaction requests including maintaining a list of buffers into which aperiodic data may be read, modified and deallocated. The functions and data structures of this unit are discussed in detail in BAIRD, section 6.3, pages 27–34.

(5) Array manager unit: This is a "thin" unit containing functions for translating stripe and stripe relative segment references of I/O transaction requests to disk block and disk numbers. The functions and data structures of this unit are discussed in detail in BAIRD, section 6.2, pages 23–27.

(6) Disk manager unit: This unit contains functions for physically performing the periodic and aperiodic I/O transactions of the requests submitted by functions of the Streaming RAID™ manager unit using the disk subsystem. The disk manager unit ensures that requests to perform periodic I/O transactions that are submitted during a current I/O cycle i (or subcycle i) are performed during the next I/O cycle i+1 (or subcycle i+1). The I/O transactions need not be performed in the order they were submitted. Rather, they are performed in an order which maximizes the number of I/O transactions that the video storage system can perform each I/O cycle or subcycle (by minimizing the movement of the disk heads). The functions and data structures of this unit are discussed in detail in BAIRD, section 6.1, pages 14–23.

Figure 15:
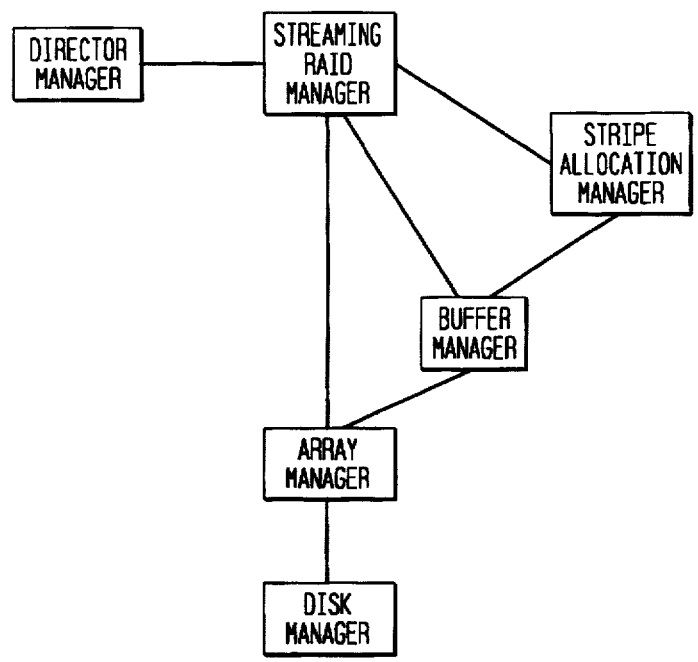
FIG. 15 illustrates the hierarchical unit organization of functions executed by the processes and disk subsystem of FIG. 13.

The above listed units are hierarchically organized as shown in FIG. 15. In other words, the client processes and daemons processes can execute functions of the Streaming RAID™ manager unit. In the course of executing Streaming RAID™ manager functions, one or more functions of the directory manager unit, the stripe allocation manager unit, the buffer manager unit, the array manager unit, or some combination thereof, may be executed. In executing functions of the stripe manager unit, one or more functions of the buffer manager unit may be executed. In executing functions of the buffer manager unit, one or more functions of the array manager unit may be executed. Finally, in executing functions of the array manager unit, one or more functions of the disk manager unit may be executed.

It is advantageous to discuss in greater detail some of the data structures and functions of the disk manager unit (at the lowest level in the hierarchy of units) and the Streaming RAID™ manager unit (at the highest level of the hierarchy of units). These units are the most significant for the understanding of how the interface implements cyclic I/O transaction scheduling.

Streaming RAID™ Manager Unit

This unit is at the highest level of the hierarchy and provides the necessary functions for the client processes to submit I/O transaction requests. The Streaming RAID™ manager unit provides functions which client processes can execute for reading data from chunks and writing data to chunks. The Streaming RAID™ manager unit provides functions for performing both periodic (cyclic) and aperiodic (non-cyclic) I/O transactions. Periodic I/O transactions are the primary type of I/O transactions for accessing stream oriented data while aperiodic transactions are largely used for housekeeping data accesses. Thus, the discussion below focuses on periodic I/O transactions.

Each of these features is discussed in greater detail below. First, both exported and internal data structures used in the execution of the Streaming RAID™ manager unit functions in accordance with these features are discussed.

1. Data Structures

The Streaming RAID™ manager unit exports (i.e., permits access to) the following data structures:

(1) Chunk ID: The chunk ID, among other things, identifies a corresponding chunk. It is thus very similar to a name for all of the data stored or to be stored in a chunk. The chunk ID includes the following fields:

Network ID
Name Domain
version number
ID

The first three fields are set to a constant value. The last field contains the reference to the chunk.

(2) Open Chunk Reference: The open chunk reference provides a handle to a recently "opened" chunk. This is a chunk for which a client process has allocated resources for I/O transactions using the Streaming RAID™ manager unit open function described below.

Figure 19:
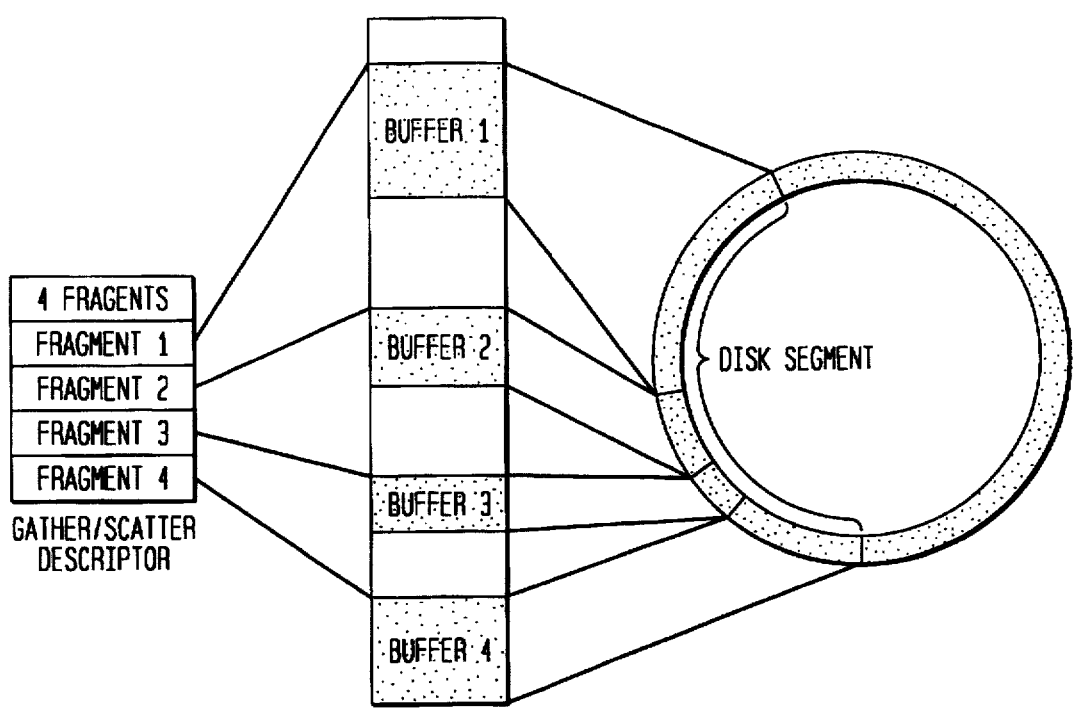
FIG. 19 pictorially illustrates a gather/scatter descriptor data structure.

(3) Directory Attributes: This data structure is for purposes of providing client processes with information about a chunk and its location in the video storage system. A directory attribute contains the following fields:
chunk ID
first stripe in chunk
bandwidth of chunk
size (in bytes) of chunk
create time
last time modified
last time accessed (4) Streaming RAID™ configuration structure: This data structure contains information about disk array parameters (segment size, base bandwidth in bits per second, total number of stripes, segments per stripe, the length of the cycle time, number of periodic and aperiodic buffers, etc.). This information is contained in the following fields:
segment size
base bandwidth in bits per second
total stripes
segments per stripe (e.g., same as number of disks)
number of periodic buffers
number of aperiodic buffers
maximum number of base bandwidth streams
cycle time In addition to these exported data structures, the Streaming RAID™ manager also contains the following internal data structures which are not directly accessible by the client processes (but which might be accessed in the normal course of executing an exported function):

(1) Gather/Scatter Descriptor: One gather/scatter descriptor is allocated to each I/O transaction request submitted for performance by the disk subsystem (by executing the disk manager unit function submit disk I/O request, discussed below). The gather/scatter descriptor manages the buffers associated with the corresponding submitted I/O transaction request. The interface according to the present invention permits dividing the segments into an arbitrary number of arbitrary sized fragments provided that the sum of the lengths of all of the fragments adds up to the length of the segment. Each gather/scatter descriptor has the following fields:
number of fragment descriptors
array of fragment descriptors Each fragment descriptor has the following fields:
pointer to buffer
length of buffer FIG. 19 pictorially illustrates the gather/scatter descriptor and its relationship to fragments, buffers and a segment.

Figure 16:
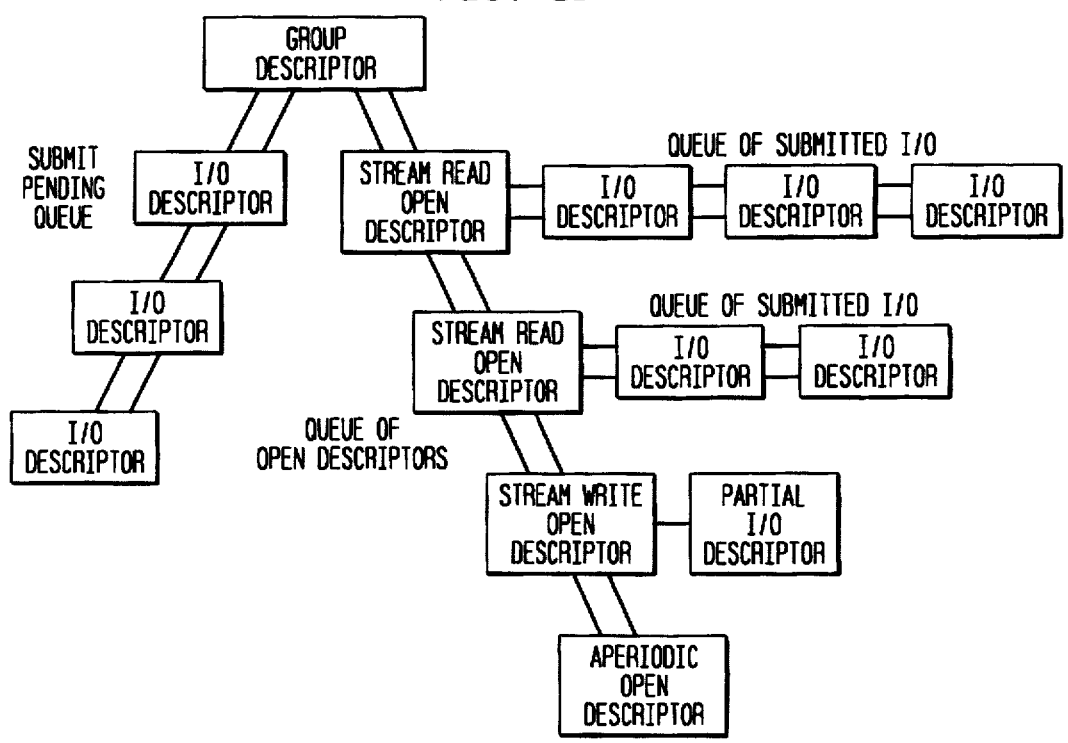
FIG. 16 pictorially illustrates the relationship between the group descriptor, open descriptors and I/O descriptors in the Streaming RAID™ manager unit.

(2) I/O Descriptor: An I/O descriptor is generated for each streaming I/O transaction to be performed. The I/O descriptor maintains the state of the pending I/O transaction for a corresponding segment. The I/O descriptor also contains (in a gather/scatter descriptor) information regarding buffers allocated for receiving data to be read or containing data to be written (whichever is appropriate) in performing the corresponding I/O transaction. Furthermore, the I/O descriptor contains (in the request tag and array completion reference pointer) information regarding notifying a client or daemon process of the completion of the I/O transaction on the corresponding segment. The fields of the I/O descriptor are:
queue link
I/O state (waiting to be submitted, submitted or complete)
I/O transaction (read or write)
I/O type (periodic, high priority aperiodic, or low priority aperiodic)
stripe number
segment number
gather/scatter descriptor for I/O transaction
request tag used by process which requested I/O transaction
array completion reference to use
back pointer to submit queue for use once submitted
back pointer to open descriptor (2) Open Descriptor: An open descriptor data structure is generated for each opened chunk (i.e., each chunk for which a client process has allocated resources for I/O transactions using the Streaming RAID™ manager unit open function described below). This data structure maintains all of the information necessary for performing all of the requested I/O transactions on the corresponding chunk. In particular, the open descriptor includes a pointer to a queue, into which I/O descriptors for each I/O transaction are enqueued. The open descriptor also includes information regarding the total number of segments on which I/O transactions are to be performed. The fields of the open descriptor are:
queue link
mutual exclusion ("mutex") lock
open mode
state (described below)
queue head for all I/O descriptors submitted for this open descriptor
array manager completion reference
directory manager completion reference
stripe allocation manager sequence reference
pointer to I/O descriptor for a partially written segment
size of a partially written segment
segment number of a partially written segment
number of base bandwidth slots consumed by this open descriptor
total number of I/O transactions submitted or pending
total number of startup I/O transactions currently submitted or pending
I/O transaction wait threshold (maximum number of I/O transactions which may be submitted at one time for this open descriptor)
number of bytes to submit per cycle
current number of bytes submitted this cycle
maximum number of bytes which may be written in any cycle
gorge semaphore (3) Group Descriptor: A group descriptor is provided for managing all open descriptors and all I/O descriptors thereof. (If a scheduling technique is used wherein the streams are divided into a number of groups, then one group descriptor may be provided for managing each group of streams. However, the inventive interface is illustrated below for the single group case wherein only a single group descriptor is provided.) A particularly important feature of the group descriptor is that this data structure segregates I/O transactions which are received during a current I/O cycle i (and which must be performed on the next I/O cycle i+1, or a particular subcycle thereof) and previously received I/O transactions which are currently pending. The group descriptor has two queues for achieving this end called the open descriptor queue and the submit pending queue. The group descriptor places each open descriptor which is a member of its group into the open descriptor queue. If an I/O descriptor is generated for an I/O transaction request which is received during a current cycle (subcycle) i, it is placed in the submit pending queue. At the start of the next I/O cycle (subcycle) i+1, all of the I/O descriptors in the submit pending queue are removed therefrom. These removed I/O descriptors are inserted into to the submit queue of their corresponding open descriptor (in the open descriptor queue of the group descriptor). This feature of the group descriptor is pictorially illustrated in FIG. 16 and described in greater detail below. The fields of the group descriptor are:

mutex semaphore
queue head for all open descriptors
max number of base bandwidth slots in group
current number of base bandwidth slots in use
current number of startup I/Os reserved for this cycle
queue head for all I/O descriptors awaiting next cycle 2. Functions The Streaming RAID™ manager unit provides several exported functions which are discussed in detail In BAIRD, section 6.6, pages 40–61. The discussion herein focusses on five functions in particular which relate to periodic read and write I/O transactions, namely, "open chunk," "close/reopen chunk," "submit stream read," "write byte stream," and "wait for completion." The state machine function described in BAIRD, section 6.6.3, pages 56–61 is then discussed.

a. Open Chunk

This function may be executed by a client process for purposes of preparing a chunk for access. When executing this function, the client process typically identifies a chunk by its chunk ID. Thus, as an initial matter, directory manager and stripe allocation manager functions are executed in order to determine the location of the chunk in the video storage system (i.e. the first stripe in the CHAT sequence). In addition, adequate resources must be allocated for the chunk including, creating an open descriptor and placing it in the appropriate queue of the group descriptor. Furthermore, if the chunk is opened for periodic I/O transactions, the client process can specify the bandwidth necessary for the I/O transaction. If no bandwidth is specified, the bandwidth specified in the directory entry corresponding to the chunk is used.

The video storage system is only capable of simultaneously supporting a particular amount of bandwidth for all periodic I/O transactions. Thus, the open chunk function also determines if there is sufficient unused bandwidth to support the periodic I/O transactions of the chunk to be opened. If not, the open chunk command does not open the chunk, but rather notifies the client process that the chunk could not be opened due to lack of available bandwidth.

Because the number of I/O transactions is guaranteed only for some multiple of the base bandwidth W, any stream with a bandwidth that is a non-integral multiple of W will be rounded up to the nearest integral multiple of W for purposes of reserving bandwidth. The amount of bandwidth consumed by the stream is exact, so the amount over-reserved by rounding up to a multiple of W must be wasted.

As a further enhancement, the interface supports a feature called "read ahead." Data read from a chunk is often decoded by a decoder in the video stream application. Such decoders contain their own buffers which must be filled to a certain extent before the decoder is started up. In order to reduce latency before the decoder can be started up, it is desirable to preliminarily read a certain amount of data bytes from the opened chunk as soon as possible. These bytes are referred to as "read ahead bytes." When a client process uses the open chunk function for a read operation, the client process can specify a non-zero number of read ahead bytes. The number of read ahead bytes is stored in the open descriptor which is created by the open chunk function.

Illustratively, the pseudo code for the open chunk function is as follows:

```
allocate an open descriptor
initialize queue heads, mutexes, and semaphores in the open descriptor;
open descriptor's open mode = "OPEN MODE";
open descriptor's state = "IDLE";
call array manager register completion reference function;
open descriptor's completion ref = returned completion ref;
call directory manager open entry function with
    chunk ID passed into this function;
open descriptor's directory manager open sequence function with
    first stripe returned in directory attributes from open
    directory entry call;
open descriptor's sequence ref = returned sequence ref;
initialize partially written segment info to "NO PARTIALS";
if (bandwidth parameter == 0)
{
    bandwidth = bandwidth from directory attributes;
}
if (open mode requests periodic I/O transactions)
{
    open descriptor's number of bytes to submit per cycle =
        (bandwidth/8) * cycle time)/1000;
    open descriptor's I/O wait threshold =
        ((bytes per cycle + segment size - 1)/segment size) - 1;
    open descriptor's maximum bytes written in any cycle = 0;
    open descriptor's current bytes per cycle =
        - read ahead bytes parameter;
}
else
{
    bandwidth = 0;
}
open descriptor's number of base bandwidth slots =
    (bandwidth + base bandwidth - 1)/base bandwidth;
if (there are enough base bandwidth slots left in group descriptor to
    handle open)
{
    add open descriptor's base bandwidth slots to group descriptor's
        current slots in use;
    enqueue open descriptor on group descriptor's open queue;
}
else
{
    back everything out and return an error;
}
open descriptor's total I/O requests submitted = 0;
returned open chunk ref = pointer to open descriptor;
``` b. Close/Reopen Chunk

In one mode, this function deallocates the resources reserved when the chunk was opened with the open chunk function. Furthermore, the directory entry for the chunk (i.e., last time modified, etc.) is updated.

In another mode, interface also supports a feature called "clips." According to the clips feature, a stream may be constructed from an arbitrary number of chunks to facilitate the editing of video information. See U.S. patent application Ser. No. 08/082,227. It is important to maintain the continuity of the stream as each chunk is successively accessed. To achieve this end, the client process can specify the next stream to open when executing the close/reopen chunk function. If such information is provided, the close/reopen chunk function does not deallocate the open descriptor and buffers. Rather, the location and other information necessary for performing I/O transactions on the second chunk is substituted for that of the first chunk in the open descriptor. The state of the open descriptor, as far as the state machine (described below) is concerned, is unaffected. The directory information regarding the first chunk is nevertheless updated.

The pseudo code for the close/reopen chunk function is as follows:

```
locate open descriptor from the open chunk reference;
if (no next chunk ID)
{
    loop while (open descriptor's total outstanding
        I/O transactions !=0)
    {
        call Streaming RAID ™ manager wait for completion function
            with chunk open reference;
        release returned buffers;
    }
    if (open descriptor has a partial write I/O transaction)
    {
        allocate a garbage buffer;
        change partial I/O descriptor's gather descriptor to fill out
            rest of segment with garbage buffer;
        loop indefinitely;
        {
            call Streaming RAID ™ state machine with
                open descriptor = this open description,
                event = "WRITE"
                I/O descriptor = partial I/O descriptor;
            if (returned condition = "GORGED")
            {
                wait on open descriptor's gorge semaphore
            }
            else
            {
                break out of loop;
            }
        }
        set partial information to "NO PARTIALS"
    }
}
if (open descriptor's mode is aperiodic)
{
    call buffer manager flush function with
        pool ref = aperiodic pool ref,
        array completion ref = open descriptor's completion ref;
}
call directory manager get directory attributes with
    directory ref = open descriptor's directory ref;
returned directory attributes access time = current time;
if (open descriptor write mode is "WRITE")
{
    directory attributes modification time = current time;
    most recent max bandwidth =
        (open descriptor's max bandwidth * 8 * 1000)/cycle time;
    if (most recent max bandwidth > directory attribute bandwidth)
    {
        directory attributes bandwidth = most recent bandwidth;
    }
}
call directory manager update directory function with
    directory ref = open descriptor's directory ref,
    attributes = updated copy of attributes;
call strip allocation manager close sequence function with
    sequence ref = open descriptor's sequence ref;
    call directory manager's close directory entry function with
        directory ref = open descriptor's directory ref;
    if (next chunk ID pointer !=NULL)
```

```
{
    call directory manager open entry function with
        chunk ID passed into this function;
    open descriptor's directory manager reference =
        returned directory reference;
    call stripe allocation manager's open sequence function with
        first stripe returned in directory attributes from open
            directory call;
    open doescriptor's sequence ref = returned sequence ref;
    initialize partially written segment info to "NO PARTIALS";
}
else
{
    subtract open descriptor's number of base bandwidth slots from
        group descriptor's number of slots in use;
    call array manager de-register completion reference function with
        completion ref = open descriptor's completion ref;
    remove open descriptor from group descriptor's open queue;
    deallocate open descriptor;
}
``` c. Submit Stream Read

This function is called by a client process for purposes of reading stream oriented data from an opened chunk. The client process can pass a buffer into which the data can be read from the video storage system. Alternatively, no buffer need be specified; the submit stream read function will allocate a buffer from a shared pool of buffers maintained by the interface.

The submit stream read function must be executed for each segment to be read. When executed, the submit stream read function generates an I/O descriptor for performing the read transaction on the specified segment. The I/O descriptor is attached to the submit pending queue of the group descriptor by executing the state machine of the corresponding open descriptor (as described below).

The client process can also provide a request tag when executing the submit stream read function. The request tag is stored in an appropriate field of the corresponding I/O descriptor. When a read segment is completed by executing the wait for completion function (described below), the request tag is returned. The client process can then use the request tag for purposes of correlating the returned segment with its corresponding read transaction.

Two constraints are imposed on performing read requests. First, a client process is limited to the number of read transaction requests that can be pending during each I/O cycle depending on the bandwidth requirement of the stream. That is, a client process which can only consume three segments in an I/O cycle should not have more than three pending read transaction requests in any cycle. The second constraint is a practical constraint on the buffer space of the implementation of the interface. Since buffer space is finite, only a certain total number of I/O transactions may be managed (submitted, pending or completed but not retrieved) by the interface at one time.

Each time the client process executes the submit stream read request function, it is determined (as described below) whether either of these constraints applies. If the buffer constraint applies, the submission proceeds but, on return from the function, the client process is instructed to execute the wait for completion function. If the buffer constraint does not apply but a full cycle's worth of I/O transactions have been submitted, the client process is blocked inside the interface until the next cycle boundary. If neither constraint applies, the client process receives a return code that allows it to execute the submit stream read function again immediately.

The pseudo code for the submit read request function is as follows:

```
locate open descriptor using chunk open reference as a pointer;
relative stripe number = relative segment offset / number of disks;
stripe relative segment number = relative segment offset MOD
        number of disks;
call stripe allocation manager find stripe function with
        sequence ref = open descriptor's sequence ref
        stripe offset = relative stripe number;
allocate an I/O descriptor;
I/O descriptor's I/O operation = read;
I/O descriptor's I/O type = periodic;
I/O descriptor's stripe number =
        stripe number returned from stripe allocation manager find
            stripe function;
I/O descriptor's segment number = stripe relative segment
        number;
I/O descriptor's gather descriptor's number of fragments = 1;
first fragment length = segment size;
if (pointer to buffer is non-null)
{
        first fragment pointer = buffer pointer;
}
else
{
        call buffer manager allocate buffer function with
            pool ref = periodic pool ref
            first fragment pointer = returned buffer pointer;
}
I/O descriptor's request tag = request tag parameter;
I/O descriptor's array completion ref = open descriptor's
        completion ref;
I/O descriptor's submit queue back pointer =
        pointer to open descriptor's submit queue;
I/O descriptor's open descriptor back pointer = pointer to open
        descriptor;
loop indefinitely:
{
        call Streaming RAID ™ state machine with
            open descriptor = this open descriptor
            event = READ
            I/O descriptor = this I/O descriptor;
        if (return condition from state machine is "GORGED")
        {
            wait on open descriptor's gorge semaphore;
        }
        else
        {
            break out of loop;
        }
}
returned condition code = what Streaming RAID ™ state machine returns;
``` d. Write Byte Stream

A client process executes this function when it desires to write stream oriented data to an opened chunk. All stream oriented writing is treated as appending to a chunk rather than overwriting the data therein. In this fashion, cache consistency problems (which occur when a chunk is overwritten) are avoided.

Because a non-integral number of segments can be written, and because the disk manager will only accept complete segments, not all of the data for a particular write byte stream invocation is guaranteed to have been submitted to the state machine by the end of the function. The I/O descriptor for any partial segment is saved with the open descriptor by storing a pointer to the I/O descriptor in the open descriptor. Data coming into the next byte stream write function will be appended to the partial I/O descriptor by adding an additional fragment to its gather/scatter descriptor. If a full segment is then available, it will be sent to the state machine, which will in turn ensure that it is written in the next cycle (subcycle). If the data passed by the next invocation still isn't enough to make a complete segment, the data is merely appended to the gather descriptor and the partial I/O descriptor persists through yet another call. Similarly, if more data is presented than is necessary to round out the segment, the current partial will be sent to the state machine, but another partial will be allocated to accommodate the overflow.

The write byte stream function operates as follows. While there is still data to be written, an I/O descriptor is generated. If data is to be written starting at the beginning of a segment then a gather descriptor is generated with a single fragment for storing the segment of data to be written. If the data bytes to be written start at a particular position in the middle of a segment, then a partial write transaction must be performed. In such a case, the gather descriptor for the partial write transaction is formed with two fragments. A garbage fragment is formed for storing garbage bytes corresponding to the first through the last byte position before the particular position at which bytes are to be written. Another fragment is then formed containing the data to be written in the positions from the particular position through the end of the segment. The data placed in the gather descriptor is subtracted from the data to be written and the above steps are repeated. The I/O descriptor is then placed in the submit pending queue of the group descriptor by executing the state machine function of the corresponding open descriptor (as discussed below)

Illustratively, client processes which execute the write byte stream function do not wait for the completion of the corresponding write transaction. Rather, the write completion daemon waits for the completion of all write transactions and appropriately releases allocated resources as the write transactions complete.

The pseudo code for the write byte stream function is as follows:

```
locate open descriptor using chunk reference as a pointer;
call directory manager get attributes function with
        directory ref = open descriptor's directory ref;
chunk size = returned attributes' chunk size;
relative stripe offset = byte offset / (segment size * number of disks);
last offset = byte offset + length of write buffer;
last relative stripe offset = last offset / (segment size * number of disks);
loop indefinitely to make chunk long enough for specified write operation:
{
        if (relative stripe offset ≥
            (chunk size / (segment size * number of disks)))
        {
            call stripe allocation manager append to sequence function
                with sequence ref = open descriptor's sequence ref;
        }
        if ((chunk size + (segment size * number of disks) ≥ last offset)
        {
            chunk size = last offset;
            break out of loop;
        }
        else
        {
            add (segment size * number of disks) to chunk size;
        }
        increment relative stripe offset;
}
loop while (length of write buffer ! = 0):
{
        relative segment offset = byte offset / segment size;
        relative stripe offset = relative segment offset / number of disks;
        segment offset within stripe = relative segment offset MOD
            number of disks;
        byte offset within segment = byte offset MOD segment size;
        amount of current segment left = segment size - byte offset
            within segment;
        if (open descriptor's partial I/O pointer is null)
        {
            allocate an I/O descriptor;
            I/O descriptor's I/O operation = write;
            I/O descriptor's I/O type = periodic;
            call stripe allocation manager find stripe function with
```

```
                sequence ref = open descriptor's sequence ref .
                stripe offset = relative stripe offset;
        I/O descriptor's stripe number =
                stripe number returned from find sequence function;
        I/O descriptor's segment number = segment offset within
                stripe;
        I/O descriptor's gather/scatter descriptor's number of
                fragments = 0;
        I/O descriptor's array completion ref =
                global stream write completion reference;
                (allocated during interface initialization)
        I/O descriptor's submit queue back pointer =
                pointer to global write submit queue;
        I/O descriptor's open descriptor back pointer =
                pointer to open descriptor;
        open descriptor's partial I/O pointer =
                pointer to I/O descriptor;
        open descriptor's segment offset of partial =
                relative segment offset;
        open descriptor's size of current partial = 0;
                if (byte offset within segment ! = 0)
                {
                        allocate some garbage bytes
                                of length (byte offset within segment);
                        partial's number of fragments = 1;
                        partial's first fragment pointer =
                                pointer to garbage bytes;
                        partial's first fragment length =
                                byte offset within segment;
                        open descriptor's size of current partial =
                                byte offset within segment;
                }
        }
        if ((partial I/O segment offset ! = relative segment offset) OR
                (byte offset within segment ! = to size of partial segment)
        {
                back out and return error;
        }
        partial size left = segment size – size of partial segment;
        if (length of write buffer ≥ partial size left)
        {
                current write length = partial size left;
                increment partial I/O descriptor's number of fragments;
                partial I/O descriptor's scatter descriptor's next available
                        fragment pointer = write buffer pointer;
                partial I/O descriptor's scatter descriptor's next available
                        fragment length = current write length;
                loop indefinitely:
                {
                        call Streaming RAID ™ state machine with
                                open descriptor = this open descriptor
                                event = WRITE
                                I/O descriptor = open descriptor's partial I/O
                                        descriptor;
                        if (return condition from state machine is "GORGED")
                        {
                                wait on open descriptor's gorge semaphore;
                        }
                        else
                        {
                                break out of loop;
                        }
                }
                open descriptor's partial I/O descriptor pointer = NULL;
        }
        else
        {
                current write length = length of write buffer;
                increment partial I/O descriptor's number of fragments;
                partial I/O descriptor's scatter descriptor's next available
                        fragment pointer = write buffer pointer;
                partial I/O descriptor's scatter descriptor's next available
                        fragment length = current write length;
        }
        add current write length to write buffer pointer;
        subtract current write length from length to write buffer;
}
if (chunk size > directory attribute's chunk size)
{
        modify directory attributes with new chunk size;
```

```
        call directory manager update attributes update function with
                directory ref = open descriptor's directory ref
                update directory attributes;
}
``` e. Wait For Completion

This function is executed by the write completion daemon and client processes which submit read transactions for purposes of retrieving completed I/O transactions. A client process may execute this function to retrieve completed read I/O transactions thereby reducing the total number of pending I/O transactions so that additional I/O transactions may be submitted.

As mentioned above, the I/O transactions are submitted to the disk manager in the order in which they are requested. However, the I/O transactions need not be completed by the disk manager in the order they were submitted. Nevertheless, I/O transactions must be completed by the interface in the order they were submitted. This is achieved as follows. The cycle daemon removes I/O descriptors from the submit pending queue of the group descriptor, uses the information in each I/O descriptor to submit an I/O request via the array manager to the disk manager, and places the I/O descriptors in the submitted queue of the corresponding open descriptor, each I/O cycle. The cycle daemon inserts the I/O descriptors into the submit queues of the open descriptors in the order in which they were submitted. The ordering of these I/O descriptors in the submit queue is not changed during the performance of the corresponding I/O transactions.

When the wait for completion function is executed, the first I/O descriptor in the open descriptor's submit queue is examined. If the I/O transaction corresponding to this first I/O descriptor is completed, the I/O descriptor is dequeued and deallocated and completion information is returned (e.g., in the case of a read, a pointer to the buffers containing the read segment is returned). If the I/O transaction corresponding to the first I/O descriptor is not complete, execution is suspended until an I/O transaction corresponding to any (not necessarily the first) I/O descriptor of the open descriptor completes. The above steps are then repeated. Note that if the I/O transaction for the second I/O descriptor in the queue completes, information regarding its completion is not returned until after I/O transaction completion for the first descriptor is returned. Thus, while I/O transactions can complete in any order, I/O transaction completions are only returned in the order in which they were submitted.

In the case that a client process has executed this function to retrieve a read I/O transaction completion, the number of total I/O transaction requests may have fallen below the threshold maximum permissible I/O transaction requests. If so, a value is returned indicating that another read I/O transaction may be requested. Otherwise, a value is returned indicating that the client process must wait for the completion of other previously submitted I/O transactions.

The pseudo code for the wait for completion function is as follows:

```
locate open descriptor using open chunk reference as a pointer;
loop while (open descriptor's submit queue is empty or I/O descriptor
        at the head of the submit queue is not in the "COMPLETED" state)
{
        call array manager wait for completion function with
                completion ref = open descriptor's completion ref;
        locate I/O descriptor using returned request tag as a pointer
```

```
            thereto;
        I/O descriptor state = completed;
}
dequeue I/O descriptor from the head of the queue;
returned request tag = I/O descriptor's request tag;
returned scatter descriptor = I/O descriptor's scatter descriptor;
deallocate I/O descriptor;
if (open descriptor's open mode is "READ")
{
    decrement open descriptor's total I/O transactions;
    if (open descriptor's total I/O transactions
            open descriptor's I/O threshold)
    {
        returned condition code = "READ";
    }
    else
    {
        returned condition code = "WAIT";
    }
}
```

3. Streaming RAID™ State Machine

Illustratively, the Streaming RAID™ manager unit provides state machine functions for purposes of controlling the performance of I/O transactions. Such state machine functions are discussed in detail in BAIRD, section 6.6.3, pages 56–61.

A state machine is assigned to each open descriptor at the time the open descriptor is allocated. Each state machine transitions from state to state depending on the occurrence of an event. The transitions from state to state occur according to a predetermined set of rules.

The state machine is invoked by executing a function with the following parameters: a pointer to the open descriptor (which contains all state information), an event type, and an optional pointer to an I/O descriptor (which is used for read and write events).

Figure 17:
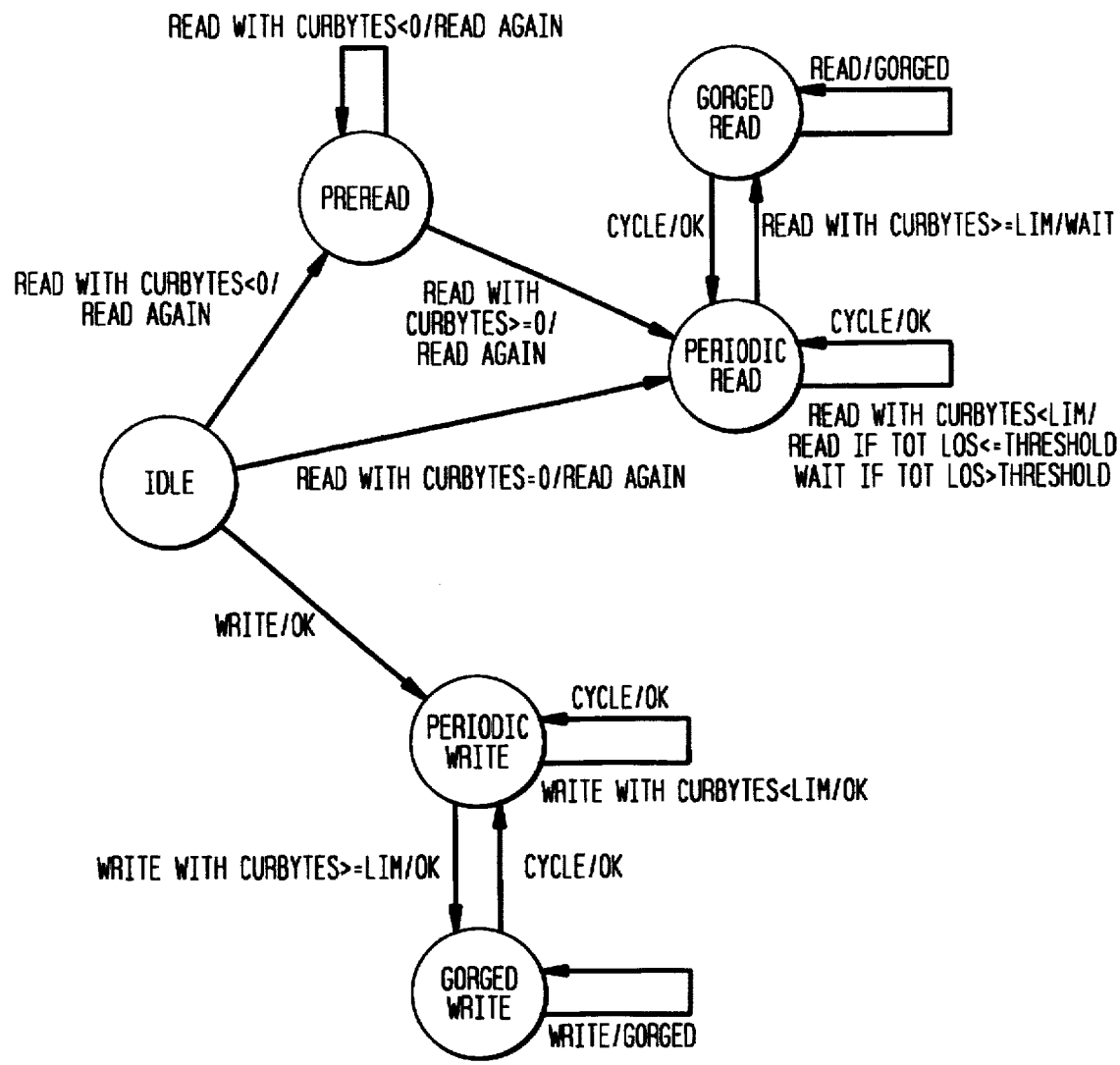
FIG. 17 illustrate a Streaming RAID™ state machine.

FIG. 17 shows a state diagram of a Streaming RAID™ state machine according to one embodiment of the present invention. As shown, the state machine has the following states:

Idle: A state machine of an open descriptor is in the idle state if no periodic I/O transactions for this open descriptor have yet begun.

Preread: This state is provided for supporting the read ahead feature. If a client process specifies a number of read ahead bytes for a read transaction on a chunk, the state machine corresponding to the open descriptor of the chunk will first transition to this state. While in this state, as many of the specified read ahead bytes as can be accommodated will be read immediately. In other words, the I/O transaction will be executed as aperiodic I/O in the cycle (subcycle) i, rather than in cycle (subcycle) i+1.

Periodic Read: A state machine of an open descriptor in the periodic read state is steadily reading periodic data, but has not yet read an entire I/O cycle's worth of data.

Gorged Read: A state machine of an open descriptor transitions to this state when a full I/O cycle's worth of data has been read. Any further submitted read transaction requests while in this state will be deferred (and will cause the submitting process to suspend execution) until the next I/O cycle (or subcycle, whichever the case may be).

Periodic Write: A state machine of an open descriptor in this state is steadily writing periodic data, but has not yet written an entire I/O cycle's worth of data.

Gorged Write: A state machine of an open descriptor transitions to this state when a full I/O cycle's worth of data has been written. Any further submitted write transaction requests while in this state will be deferred (and will cause the submitting process to suspend execution) until the next I/O cycle (or subcycle, whichever the case may be).

Error: A state machine of an open descriptor transitions to this state when an unanticipated event occurs. For example, while in the preread, periodic read or gorged read state, a write event should not occur and is indicative of a serious error in the operation of the interface.

The following events can cause the state machines to transition from one state to another state:

Read: A read event occurs whenever a read transaction request is submitted. It is assumed that most read transaction requests are submitted for reading data from sequential segment offsets.

Write: A write event occurs whenever a write transaction request is submitted. It is assumed that most write transaction requests are submitted for writing data at sequential segment offsets.

Cycle: A cycle event is completely within the purview of the cycle daemon. The cycle daemon, among other things, causes this event to occur for each open descriptor each time it initiates an I/O cycle or subcycle, whichever the case may be.

FIGS. 18(a), (b), (c), (d), (e), (f) and (g) contain tables illustrating transitions from state to state depending on the occurrence of an event.

Disk Manager Unit

The disk manager unit contains functions and data structures for receiving I/O transaction requests and for ordering these requests in a fashion which speeds up their performance by the video storage system. The disk manager also has functions and data structures for submitting these requests for performance by the disk subsystem according to a cyclic schedule. Note that while client processes execute disk manager code, the client process never executes functions of the disk manager unit directly. Rather, all disk manager functions are executed at the behest of units higher in the hierarchy of units.

1. Data Structures

The following data structure is exported (accessible) to the client processes, daemon processes and disk subsystem:

(1) Gather/Scatter Descriptor: The gather/scatter descriptor used in the disk manager unit is the same as the one used in the Streaming RAID™ manager unit (described above).

The disk manager unit supports the following internal data structures which cannot be accessed directly by the client processes, daemon processes or disk subsystem:

(2) Command Descriptors: Each time an I/O transaction is submitted for performance by the disk subsystem (by executing the disk manager unit function submit disk I/O request, discussed below), a command descriptor is allocated to a command for performing the submitted I/O transaction. The command descriptors are queued for execution by the disk subsystem. Each command descriptor has the following fields:
general queue link
completion context pointer
I/O request tag
starting block for I/O transaction
number of blocks in I/O transaction gather/scatter descriptor The I/O request tag is created and used by the caller in a manner similar to how I/O request tags are managed in the Streaming RAID™ manager unit. However, the request tag passed to the disk manager usually does not have the same value as the tag passed to the Streaming RAID™ manager. For stream I/O, the request tag value is usually a pointer to the Streaming RAID™ I/O descriptor. This allows the I/O descriptor to be located quickly when the disk manager completes the I/O request.

(3) Completion Context: The interface permits execution of I/O transactions in a different order than the order in which they were submitted and for the execution of I/O transactions for several streams simultaneously. The completion context data structure provides a mechanism for grouping the completion of I/O transactions for subsequent retrieval by client processes on a stream-by-stream basis for read streams, or the write completion daemon for all write streams. The completion context has the following fields:

completed I/O transaction queue head
completion semaphore (4) Disk Descriptors: A disk descriptor is assigned to each disk of the disk array. The purpose of the disk descriptor is to manage the submission of individual I/O transactions according to a predetermined cyclic schedule. To that end, each disk descriptor is provided with a number of queues including: high and low priority aperiodic queues for aperiodic I/O transactions, an inactive periodic queue, an active periodic queue and an in-progress queue. The purpose of the inactive periodic queue is to receive I/O transaction requests during a current cycle (sub-cycle) i for performance during the next cycle (sub-cycle) i+1. The active periodic queue is for holding command for performing I/O transaction requests for performance during the current I/O cycle (subcycle). The in-progress queue is a small queue (e.g., with a depth of two) for purposes of holding the I/O transaction requests currently being performed. Some disk subsystem hardware, e.g., a SCSI-2 interface, support tagged command queuing wherein more than one command for performing I/O transaction request may be submitted at one time. Such a feature can be used to reduce SCSI bus latency—when one I/O transaction completes, another previously submitted I/O transaction may begin even before the results of the previous I/O transaction have been transferred to the host. However, disk subsystems which support this feature tend to sort the submitted commands for performing I/O transaction requests. This is undesirable in the interface according to the invention because the disk subsystem can potentially reorder the I/O transaction after they have already been placed in a specific order by the interface.

By keeping the in-progress queue small, the disk subsystem is restricted to performing the I/O transactions in the order determined by the interface according to the present invention.

The disk descriptor has the following fields:
active periodic queue head
inactive periodic queue head
high-priority aperiodic queue head
low-priority aperiodic queue head
in-progress queue head.

Figure 20:
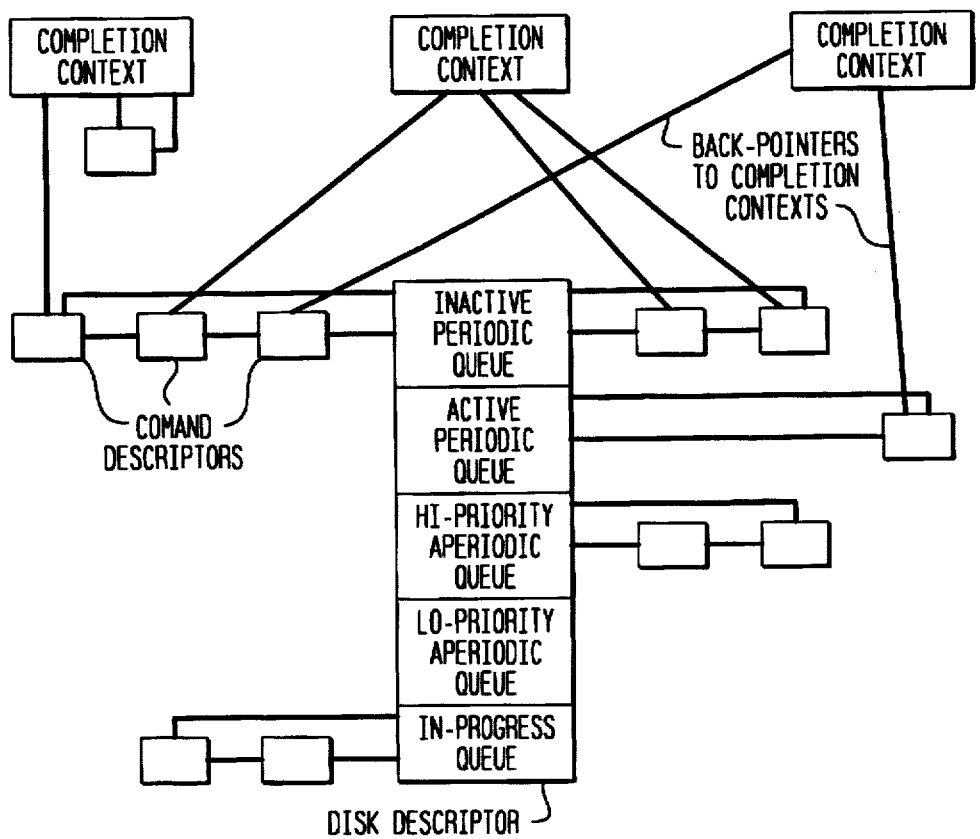
FIG. 20 pictorially illustrates the relationship between command descriptors, completion contexts and a disk descriptor in the disk manager unit.

FIG. 20 illustrates the relationship between a disk descriptor, command descriptors and completion contexts.

2. Functions

The disk manager unit provides several exported functions. See BAIRD, section 6.1.2, pages 18–23. However, only three functions are discussed in detail below, namely, "submit disk I/O request," "disk I/O completion interrupt handler," and "start cycle."

a. Submit Disk I/O Request

This function is executed in the course of executing the Streaming RAID™ manager submit stream read function or the Streaming RAID™ manager write byte stream function. (The Streaming RAID™ manager submit stream read function executes the array manager function segment read function, and the Streaming RAID™ manager write byte stream function executes the array manager segment write function. The array manager segment read function and segment write function, in turn, execute the disk manager submit disk I/O request function.) However, the submit disk I/O request function is also executed in the course of executing the Streaming RAID™ manager aperiodic read and aperiodic write functions.

As mentioned above, and as shown in FIG. 20, an intricate queuing technique is used for purposes of properly scheduling I/O transactions. The submit I/O request function appropriately queues each submitted I/O transaction request in its appropriate queue. When the submit I/O request function is executed, a command descriptor is generated for a command for performing the I/O transaction (read or write). If the I/O transaction is an aperiodic read or write transaction, the command descriptor is enqueued on the high or low priority aperiodic queue of a disk descriptor for the appropriate disk (determined by the array manager). If sufficient time remains in the cycle to perform aperiodic I/O transactions, one or more of the high (and possibly low) priority aperiodic I/O transactions are performed. Otherwise, aperiodic I/O transactions are deferred in favor of performing periodic I/O transactions.

If the I/O transaction is periodic, then the command descriptor corresponding thereto is enqueued on the inactive periodic queue, not the active periodic queue. The command descriptor is inserted into the inactive periodic queue in an order which maximizes the number of I/O transactions which may be performed during an I/O cycle (subcycle). That is, the command descriptor is queued such that disk head movement of the disk is minimized. For instance, the command descriptors may be sorted within the inactive periodic queue so that their corresponding starting disk block numbers are in ascending order. As discussed in greater detail below, at the occurrence of the next I/O cycle, the cycle daemon dequeues all command descriptors from the inactive periodic queue into the active periodic queue. Illustratively, this ensures that all I/O transactions submitted on the current I/O cycle i are not performed until the next I/O cycle i+1.

The pseudo code for the submit disk I/O request is as follows:

```
allocate a command descriptor;
copy block number, number of blocks, read/write flag, gather/scatter
    descriptor
        completion reference, and request tag into command descriptor;
use disk number to locate appropriate disk descriptor;
if (I/O transaction type is periodic)
{
    insert command descriptor on disk descriptor's inactive periodic
        queue such that starting block numbers are sorted in
        ascending order;
}
```

```
else if (I/O transaction type is high-priority aperiodic)
{
    insert command descriptor on disk descriptor's high-priority
        aperiodic queue such that block numbers are sorted in
        descending order;
}
else if (I/O transaction type is low-priority aperiodic)
{
    enqueue command descriptor on end of low-priority queue;
}
loop while (active periodic queue is empty AND in-progress
    queue is not full):
{
    if (there's enough time left in this I/O cycle to perform an aperiodic
        I/O transaction)
    {
        if (disk descriptor's high-priority aperiodic queue ! = empty)
        {
            dequeue command descriptor from high-priority
                aperiodic queue;
        }
        else if (disk descriptor's low-priority aperiodic queue ! =
            empty)
        {
            dequeue command descriptor from low-priority
                aperiodic queue;
        }
    }
    if (a command descriptor was dequeued)
    {
        enqueue command descriptor on in-progress queue;
        use information in command descriptor to submit read or
            write to disk subsystem;
    }
    else
    {
        exit loop
    }
}
``` b. Disk I/O Completion Interrupt Handler

This function is not executed by any client or daemon process, but rather is an interrupt driven function executed by the disk subsystem. When an I/O transaction is completed by the disk subsystem, an appropriate interrupt is generated. This causes the disk subsystem to dequeue the command descriptor from the in-progress queue of the disk descriptor and to enqueue the command descriptor on the appropriate completion context queue. The disk subsystem then dequeues another command descriptor from the active periodic queue of the disk descriptor, or, if the active periodic queue is empty, from the low or high priority aperiodic queues. The dequeued command descriptor is then queued into the in-progress queue and a command is submitted to the disk subsystem for performing the I/O transaction corresponding thereto.

The pseudo code for the disk I/O completion interrupt handler is as follows:

```
interrogate disk subsystem hardware to determine which disk completed
    the I/O transaction request;
use hardware result to locate disk descriptor by indexing into the
    descriptor table;
dequeue the completed command descriptor from the in-progress queue;
locate completion context by de-referencing completion ref in the
    command descriptor;
enqueue command descriptor on completion context's completion queue;
signal completion context's semaphore to wake up any process that is
    waiting for an I/O transaction;
loop while (in-progress queue is not full):
{
    if (disk descriptor's active periodic queue is not empty)
    {
        dequeue command descriptor from active periodic queue;
    }
    else if (there's enough time left in current I/O cycle to do an
        aperiodic I/O transaction)
    {
        if (disk descriptor's high-priority aperiodic queue is not
            empty)
        {
            dequeue command descriptor from high-priority
                aperiodic queue;
        }
        else if (disk descriptor's low-priority aperiodic queue is not
            empty)
        {
            dequeue command descriptor from low-priority
                aperiodic queue;
        }
    }
    if (a command descriptor was dequeued)
    {
        enqueue command descriptor on in-progress queue;
        use information in command descriptor to submit read or
            write to disk subsystem;
    }
    else
    {
        exit loop;
    }
}
return from interrupt;
``` c. Start Cycle

This function is executed by the cycle daemon once each I/O cycle for purposes of delineating the boundaries of each I/O cycle for the disk subsystem. To that end, the cycle daemon switches the inactive periodic queue and active periodic queue. Thus, the command descriptors in the inactive periodic queue of each disk descriptor on cycle i are moved to the active periodic queue thereof on the cycle i+1. Furthermore, while the in-progress queue is not full, the cycle daemon moves the first command descriptor from the active periodic queue to the in-progress queue. If no command descriptors are present therein, and there is time to perform an aperiodic I/O transaction, the first command descriptor is moved from the high priority aperiodic queue or the low priority aperiodic queue to the in-progress queue. If a command descriptor is moved to the in-progress queue, then a command is submitted to the disk subsystem for performing the transaction corresponding to the first command descriptor in the in-progress queue.

Note that an I/O cycle is not a cause for terminating periodic I/O transactions. Under extraordinary conditions, such as a disk error, it is possible that the active periodic queue is not empty when a cycle boundary is reached. This is an example of cycle overflow. In such a case, the switching of the inactive and active periodic queues is delayed until the active periodic queue is emptied. This could cause the I/O cycle boundaries to drift from their predetermined intervals. To prevent such cycle drift from occurring, the cycle daemon will appropriately adjust the timer period so that the cycle daemon wakes up to initiate the next I/O cycle at the predetermined I/O cycle boundary interval.

The pseudo code for the start cycle function is as follows:

```
if (previous cycle ran too long)
{
    adjust next cycle boundary to remove cycle boundary drift caused
        by cycle overflow;
}
for (each disk in the array)
```

```
{
    switch the disk descriptor's inactive periodic queue with the active
        periodic queue;
}
start cycle timer;
for (each disk in the array)
{
    loop while (in-progress queue is not full)
    {
        if (disk descriptor's active periodic queue is not empty)
        {
            dequeue command descriptor from active periodic
                queue;
        }
        else if (there is enough time left in I/O cycle to perform an
                aperiodic I/O transaction)
        {
            if (disk descriptor's high-priority aperiodic queue
                is not empty)
            {
                dequeue command descriptor from high-priority
                    aperiodic queue;
            }
            else if (disk descriptor's low-priority aperiodic queue
                is not empty)
            {
                dequeue command descriptor from low-priority
                    aperiodic queue;
            }
        }
        if (a command descriptor was dequeued)
        {
            enqueue command descriptor on in-progress queue;
            use information in command descriptor to submit read
                or write to disk subsystem;
        }
        else
        {
            exit loop;
        }
    }
}
```

EXAMPLE

The operation of the interface is now illustrated by way of example. First, initialization functions are executed by the hardware which executes the interface (disk subsystem, video server, etc.). See BAIRD, section 6.6.2, pages 43–44. The initialization functions spawn the cycle daemon, flush daemon and write completion daemon processes. Illustratively, the cycle daemon process has the following pseudo code:

```
for (each appropriate I/O descriptor on the submit pending queue for the
    group descriptor that corresponds to the current subcycle):
{
    dequeue I/O descriptor;
    if (I/O transaction is READ)
    {
        call array manager read function with
            completion ref = I/O descriptor's completion ref
            stripe number = I/O descriptor's stripe number
            segment number = I/O descriptor's segment number
            I/O transaction type = I/O descriptor's I/O transaction
                type
            scatter descriptor = I/O descriptor's scatter descriptor
            request tag = pointer to I/O descriptor;
        enqueue I/O descriptor on queue head pointed to by I/O
            descriptor's submit queue back pointer;
    }
    else if (I/O transaction is WRITE)
    {
        call array manager write function with
            completion ref = I/O descriptor's completion ref
            stripe number = I/O descriptor's stripe number
            segment number = I/O descriptor's segment number
            I/O transaction type = I/O descriptor's I/O transaction
                type
            scatter descriptor = I/O descriptor's scatter descriptor
            request tag = pointer to I/O descriptor;
        enqueue I/O descriptor on queue head pointed to by I/O
            descriptor's submit queue back pointer;
    }
}
for (each open descriptor on the open queue for the group descriptor that
    corresponds to the current subcycle):
{
    call Streaming RAID ™ state machine function with
        open descriptor = current open descriptor
        event = "CYCLE"
        I/O descriptor = null;
}
call disk manager start cycle function;
call disk manager wait for cycle boundary function;
```

The following piece of pseudo-code represents a disk producer client process. This client process is capable of generating a stream of bytes from a movie or track of movie that contains a clip list. The clip list is an array of clip interval structures, each of which contains the following information:

chunk ID starting segment number ending segment number

As the disk producer process retrieves data from the interface, it hands off to a network streamer process for transmission over the network. When the network streamer process is through transmitting a buffer full of data, it releases the buffer resource so the disk producer can fill it up again.

The pseudo-code for the disk producer is as follows.

```
call Streaming RAID ™ open function with
    chunk ID = first clip interval's chunk ID
    open mode = periodic read
    stream bandwidth = stream bandwidth for movie or track
    readahead bytes = readahead bytes for movie or track;
save returned open chunk reference;
for (each clip interval in the clip list)
{
    current segment = clip interval's starting segment number;
    loop while (current segment <= clip interval's ending
        segment number)
    {
        allocate a buffer;
        call Streaming RAID ™ submit stream read function with
            open ref = saved open chunk reference
            segment offset = current segment
            buffer pointer = pointer to allocated buffer
            request tag = NULL;
        if (return from function = WAIT)
        {
            loop indefinitely:
            {
                call Streaming RAID ™ wait for completion
                    function with
                    open ref = saved open chunk reference;
                pass returned scatter descriptor (which will
                    contain the previously allocated buffer)
                    to the network streamer process;
                if (returned condition code says "GO READ AGAIN")
                {
                    exit loop;
                }
            }
        }
        increment current segment;
```

```
}
if (this is not the last clip interval in the clip list)
}
    call Streaming RAID ™ close/reopen chunk function with
        open ref = saved open chunk reference
        next chunk ID = next clip interval's chunk ID;
    }
}
loop indefinitely to complete any remaining I/O transactions:
{
    call Streaming RAID ™ wait for completion function with
        open ref = saved open chunk reference;
    if (returned condition code says "NO MORE I/OS
        OUTSTANDING")
    {
        exit loop;
    }
    else
    {
        pass returned scatter descriptor (which will contain a previously
            allocated buffer) to the network streamer process;
    }
}
call Streaming RAID ™ close chunk function with
    open ref = saved open chunk reference,
    next chunk ID = NULL (indicating open state is to be destroyed);
stream has now completed;
```

Suppose a client process (video application) desires to read stream oriented data from a chunk utilizing the read ahead feature on the cycle i. The client process first executes the open function and specifies an identifier for the chunk and the number of desired read ahead bytes. During the execution of this function, other functions of the directory manager and stripe allocation manager may be executed to determine information regarding this chunk, such as the first stripe of the chunk, the bandwidth requirement for I/O transactions on the chunk, etc. Additionally, an open descriptor is generated for the chunk and placed in the group descriptor's open descriptor queue. A state machine is also created for the open descriptor and placed in the "idle" state.

The client process then executes the submit stream read function. As a result, an I/O descriptor is generated for the segment to be read. Furthermore, the state machine function for the open descriptor is executed with the "read" state. As shown in FIGS. 17 and 18 (a), a read event transitions the state machine from the idle state to the preread state provided that curbytes is negative, indicating that some amount of readahead was specified during open. Since readahead was specified, the state is transitioned to preread as long as the state machine detects that there is enough time in the current cycle to execute the aperiodic I/O transaction necessary for readahead. In the course of executing the state transition, an aperiodic I/O transaction is submitted to the disk manager via the array manager. Because it is aperiodic, it will be executed as soon as periodic I/O transaction in the current cycle (subcycle) completes, thereby reducing startup latency.

As the disk manager receives the I/O transaction request, it allocates a command descriptor and enqueues it on the high-priority aperiodic queue of the appropriate disk descriptor. Assuming there is no outstanding periodic I/O transaction and that the disk's in-progress queue isn't full, the I/O transaction request will be submitted to the disk subsystem immediately.

The I/O descriptor is also enqueued onto the open descriptor's submitted queue in the order than it was submitted. Furthermore, curbytes is increased by the number of bytes in a segment, and the number of I/O transactions executed in the preread state, known as the startup I/O count, is incremented.

Assume that the client process executes the submit stream read function several times more before the next I/O cycle occurs. Each successive execution of the submit stream read function produces the same state transition as described above until curbytes becomes a positive number. At this point, the state machine transitions to the periodic read state.

In the periodic read state transition, instead of submitting the I/O transaction directly to the array manager, the I/O descriptor is enqueued onto the group's submit pending queue. This ensures that, if there is more than one subcycle per cycle, the I/O transaction will not be submitted until its group's subcycle becomes active. Furthermore, curbytes continues to be increased by the number of bytes in a segment. Finally, the count of the total number of I/O transactions submitted is incremented. Note that this number is different than the startup I/O transaction count.

As the client process continues to execute the submit stream read function in the periodic read state, the same periodic read transition function is executed. Assuming that the cycle daemon doesn't wake up and initiate the next cycle or subcycle i+1 yet, eventually, one of the following occurs:

(1) the value of curbytes exceeds that of limit bytes, indicating that a full cycle's worth of bytes has been requested for the current cycle;

(2) The count of the total number of I/O transactions submitted exceeds the I/O transaction submission threshold.

Assume that the former (1) happens. The state machine then transitions to the gorged read state. As this transition occurs, the count of startup I/O transactions is added to the total number of I/O transactions submitted and the number of startup I/O transaction is set to 0. By accounting for the startup I/O transactions separately from the total I/O transactions submitted, the state machine avoids causing the client to wait for I/O transaction completion until a full cycle's worth of periodic I/O transactions, in addition to any extra startup (readahead) I/O transactions, has been submitted. As the transition completes, the client process receives a return code that instructs it to wait for some of the I/O transactions to complete.

Meanwhile, the disk subsystem has been processing the aperiodic startup I/O transaction. As each I/O transaction is completed, its command descriptor is removed from the in-progress queue and placed on the completed I/O queue in the completion context that was allocated for the stream when it was opened. When the client process executes, per the instructions of the state machine, a wait for completion function, one of two things can happen:

(1) No I/O transactions may yet be complete. In this case, the client process will suspend by waiting on the completion context's semaphore. When an I/O transaction completes, the semaphore will be signalled, causing the client process to resume.

(2) I/O transactions may already be complete. In this case, the client process will find the semaphore already signalled, so it won't suspend.

In either case, the client process eventually dequeues the first I/O transaction it finds and returns with its I/O request tag. The I/O request tag is used to locate the I/O descriptor which is now enqueued on the open descriptor's submitted queue. The client process marks the I/O descriptor's state as "complete" and checks to see if the I/O descriptor was the first one on the queue. Assuming it wasn't, this means that an I/O transaction has completed out of order, so the client process calls the disk manager's wait for completion function again, repeating the above process.

Eventually, the I/O transaction corresponding to the first I/O descriptor on the queue will complete. When this happens, the client process removes the I/O descriptor from the open descriptor's queue, returns the appropriate buffer and request tag information, decrements the total count of submitted I/O transactions, and destroys the I/O descriptor. The client program is now able to pass the data on to whatever application-specific entity needs it.

Because more than one startup I/O transaction was submitted and the startup count was added into the total I/O transaction count, the total I/O transaction count is greater than the I/O transaction threshold by more than one. For this reason, the client process has been instructed to execute another wait for completion, which repeats the procedure for waiting outlined above. Finally, all of the aperiodic I/O transactions will complete, and the total I/O transaction count will equal the I/O transaction threshold count. The streaming RAID manager will therefore signal the client process that it's time to read again.

At this point, one of two things may have happened.

(1) All of the aperiodic I/O transactions may have completed before the cycle boundary occurs.

(2) The cycle boundary may have already occurred.

Assume the former (1). In this case, when the client process executes another submit stream read function, the state machine is still in the gorged read state. The read state transition for the gorged read state does not enqueue the I/O descriptor or call the disk manager. Instead, it merely returns a "gorged" condition code. The submit stream read function, when it detects this condition code, does not return back into the client program. Instead, it waits on the open descriptor's gorge semaphore, causing the client process to suspend. At this point, the client process has an I/O descriptor that it hasn't yet been able to submit to the state machine. This condition will persist until the next cycle boundary or, if there is more than one subcycle per cycle, until the group's next available subcycle occurs.

At the expiration of the current cycle (or, if there is more than one group, the current subcycle), the cycle daemon, which has been suspended in the disk manager, is awakened. First, it locates the group descriptor for the current subcycle. It then dequeues each I/O descriptor that has been placed on the submit pending queue by all client processes that have submitted I/O transactions during the current cycle (or, if there is more than one group, since the last time the group's subcycle occurred). As each I/O descriptor is dequeued, the information in the descriptor is used to submit an I/O transaction request, via the array manager, to the disk manager. The disk manager creates a command descriptor and sorts it onto the inactive periodic queue for the appropriate disk descriptor so that the starting block numbers of each request are in ascending order, thereby minimizing disk access time. Once the I/O transaction request has been submitted, the I/O descriptor is enqueued on the submitted queue of the open descriptor which controls the stream that requested the I/O transaction. It is enqueued therein in the same order that the I/O transaction was submitted, so that subsequent completion requests can be returned in the proper order.

Once all I/O descriptors have been serviced in this fashion, the cycle daemon "runs the list" of open descriptors on the group's open descriptor queue. For each open descriptor, the cycle daemon executes the state transition function to signal a cycle event for the state machine associated with the open descriptor. The causes limit bytes to be subtracted from curbytes. For client processes that are blocked in the gorged state, the cycle transition causes the open descriptor's gorge semaphore to be signalled, thereby unblocking the client process. The transition function also transitions the state machine back to the periodic read state, so that the stream is ready to have another cycle's worth of I/O transactions submitted for it. Note that because limit bytes reflects the exact number of bytes per cycle required to satisfy the requested bandwidth, bandwidths which require a non-integral number of segments per cycle will naturally submit varying numbers of segments at just the right rate to most closely satisfy the requested bandwidth.

When all open descriptors have been serviced in this fashion, the cycle daemon calls the disk manager's start cycle function. This results in the command descriptors on each inactive queue being moved to the corresponding active queue. Furthermore, if the in-progress queues are not full, the first command descriptors on the active periodic queues are dequeued, the information therein is used to submit requests to the disk subsystem, and then the first command descriptors are enqueued on the in-progress queue. The cycle daemon then suspends its execution until the end of the cycle that has just begun.

During the new cycle, the disk subsystem performs the I/O transactions corresponding to the command descriptors in the in-progress queue. When an I/O transaction completes, an interrupt is generated. Each time an interrupt is generated, the disk subsystem dequeues the command descriptor of the completed I/O transaction and then enqueues it onto the queue of the completion context associated with the original disk manager request. The disk subsystem then fills the vacancies in the in-progress queue with command descriptors from the active periodic queue. Furthermore, for each command descriptor moved into the in-progress queue, a command is submitted to the disk subsystem for performing the I/O transaction corresponding thereto. If the active queue is completely emptied during the course of the cycle, command descriptors will be dequeued first from the high-priority aperiodic queue and, should that queue be completely emptied, from the low-priority aperiodic queue. If no command descriptors are available, the disk subsystem is allowed to go idle.

Meanwhile, because the client process is now resumed due to the signalling of the gorge semaphore and its state machine is back to the periodic read state, the I/O descriptor that before could not be submitted is re-submitted to the state machine, where a read transition in the periodic read state causes behavior that has been described above. One key difference will be observed now, however. Because the total count of I/O transactions is now equal to the I/O transaction threshold, every time an I/O transaction is submitted, the state machine tells the client process to wait for the completion of one of the previously submitted I/O transactions. Once an I/O transaction is completed, the reduction in the I/O transaction count results in the client being signalled that another I/O transaction can be submitted. Consequently, the client process settles down to a steady sequence of one submission followed by one wait, with the process occasionally being suspended by the gorged read state.

This pattern of behavior will continue until the end of the chunk is reached (which results in an error being returned from the submit stream read function), or until the application decides to terminate the stream. To terminate the stream, the client process repeatedly executes the wait for completion function, disregarding any indication that it is permissible to submit additional I/O transaction requests, until a condition code is returned indicating that there are no more I/O transactions outstanding. The client process then closes the stream (using the close function), resulting in the release of the stream resources and the destruction of the open descriptor.

Conclusion

It may be appreciated from the above example that submitted I/O transactions cannot be performed until they are placed in the active pending queue of a disk descriptor. However, I/O transactions submitted during a current I/O cycle (subcycle) i are not placed into the active pending queue until the next I/O cycle (subcycle) i+1. Likewise, the completions of I/O transactions cannot be retrieved until the I/O descriptors thereof are placed in the submit queue of their corresponding open descriptor (in the open descriptor queue of the group descriptor). Again, I/O descriptors received during a current cycle (subcycle) i are queued in the submit pending queue and are not dequeued therefrom for placement in the appropriate submit queue of their corresponding open descriptor until the next I/O cycle (subcycle) i+1. Thus, the interface provides for cyclic scheduling.

Furthermore, dual I/O transaction management is provided using I/O descriptors in the Streaming RAID™ manager unit and command descriptors in the disk manager unit. This enables performing the I/O transactions in an order different from their order of submission yet ensures that the completions of the I/O transactions are returned in the order they were submitted.

Finally, the above-discussion is intended to be merely illustrative of the invention. Those having ordinary skill in the art may devise numerous alternative embodiments without departing from the spirit and scope of the present invention.

We claim:

1. A method for accessing data of one or more streams in a disk array of at least one disk comprising the steps of:
   (a) enqueuing one or more command descriptors for performing I/O transactions, corresponding to each request that issued during a current cycle i, into an inactive periodic queue, during said cycle i,
   (b) delaying performing said I/O transactions of said command descriptors in said inactive periodic queue until a subsequent cycle i+1,
   (c) at a beginning of said cycle i+1, placing said command descriptors in said inactive periodic queue into an active periodic queue,
   wherein during each cycle, I/O transactions are performed for each command descriptor in said active periodic queue, but not performed for command descriptors in said inactive periodic queue.

2. The method of claim 1 further comprising, prior to step (a), the steps of:
   (d) during said cycle i, enqueuing an I/O descriptor for each I/O transaction requested during said cycle i into a submit pending queue,
   (e) at said beginning of said cycle i+1:
     (e1) dequeuing each of said I/O descriptors from said submit pending queue and enqueuing each dequeued I/O descriptor into a submitted I/O transaction queue associated with the stream on which said I/O transaction of said I/O descriptor corresponds,
     (e2) for each of said I/O descriptors, performing steps (a)–(c).

3. The method of claim 2 further comprising, prior to said step (d), the steps of:
   (f) opening a chunk assigned to a particular stream on which one or more I/O transactions are to be performed and allocating resources for said chunk.

4. The method of claim 3 further comprising the steps of:
   (f1) allocating bandwidth for transmitting data read or written during each I/O transaction performed on said particular stream,
   (f2) generating an open descriptor for said particular stream including a submitted I/O transaction queue for storing I/O descriptors of submitted pending I/O transaction requests, and
   (f3) generating a completion context in which command descriptors for completed I/O transactions are enqueued.

5. The method of claim 4 further comprising the steps of:
   (g) if said chunk is closed but a second chunk is specified to be opened immediately thereafter, assigning said resources allocated to said chunk to said second chunk.

6. The method of claim 1 further comprising the steps of:
   (d) prior to said cycle i+1, ordering each command descriptor in said inactive periodic queue to increase the number of I/O transactions that can be performed during said cycle i+1, and
   (e) during said cycle i+1:
     (e1) dequeuing up to a predetermined number of command descriptors from the head of said active periodic queue and enqueuing each of said dequeued command descriptors into an in-progress queue, and
     (e2) sequentially issuing to said disk array a command for performing said I/O transaction corresponding to each command descriptor in said in-progress queue.

7. The method of claim 1 further comprising the steps of, as each I/O transaction completes:
   (d) dequeuing said command descriptor corresponding to a completed I/O transaction,
   (e) enqueuing said dequeued command descriptor corresponding to said completed I/O transaction onto a completion context corresponding to a stream for which said I/O transaction was performed, and
   (f) signaling a semaphore associated with said completion context onto which said command descriptor for said completed I/O transaction was dequeued.

8. The method of claim 6 further comprising the steps of:
   (f) as each I/O transaction completes, dequeuing said command descriptor corresponding to said completed I/O transaction,
   (g) if said active periodic queue is not empty, performing said steps (e), (e1) and (e2) and
   (h) if said active periodic queue is empty, dequeuing from an aperiodic queue one or more command descriptors for performing I/O transactions other than for reading or writing stream data, enqueuing each command descriptor that was dequeued from said aperiodic queue into said in-progress queue and sequentially issuing to said disk array a command for performing said I/O transaction corresponding to each command descriptor in said in-progress queue.

9. The method of claim 2 wherein in said step (e1), each I/O descriptor is enqueued into said submitted I/O transaction queue in the same order in which said requests for performing said I/O transactions are requested.

10. The method of claim 9 comprising the steps of:
    (f) dequeuing said I/O descriptors from said submitted I/O transaction queue in the same order in which they are stored when said I/O transactions corresponding to said I/O descriptors complete.

11. The method of claim 10 further comprising the step of:
    (g) limiting the number of outstanding submitted requests for performing I/O transactions for each stream to a predetermined maximum number.

12. The method of claim 11 further comprising the steps of:

(h) decreasing a count of the number of outstanding submitted requests for performing I/O transactions on said particular stream for each I/O descriptor dequeued from said submitted I/O transaction queue of said particular stream.

13. The method of claim 6 further comprising the step of:
(f) if at the end of said cycle i+1, at least one I/O transaction corresponding to a command descriptors enqueued into said active periodic queue at said start of said cycle i+1 is not complete, adjusting a duration of said cycle i+2 to prevent drifting of boundaries of said cycles.

14. The method of claim 1 further comprising the step of:
(d) limiting the number of outstanding submitted requests for performing I/O transactions for each stream to a predetermined maximum number.

15. The method of claim 14 further comprising the steps of:
(e) dequeuing an I/O descriptor from a submitted I/O transaction queue of a particular stream when said I/O transaction corresponding to said I/O descriptor completes, and
(f) decreasing a count of the number of outstanding submitted requests for performing I/O transactions on said particular stream.

16. The method of claim 1 further comprising the step of: predefining the cycle time duration as $N_d\,S/W_{base}$, where $N_d$ is the number of disks in the array, S is the number of bits consumed or produced for each stream during the cycle and $W_{base}$ is a base bandwidth of each stream.

17. A method for performing I/O transactions on stream oriented data comprising the steps of:
(a) for each request to perform an I/O transaction on a stream issued during a current cycle i, enqueuing an I/O descriptor into a submit pending queue,
(b) at the beginning of the next cycle i+1, dequeuing each of said I/O descriptors from said submit pending queue and enqueuing said dequeued I/O descriptors into a submitted I/O transaction queue associated with said stream on which said I/O transaction of said I/O descriptor is to be performed, said I/O descriptors being enqueued into each associated submitted I/O transaction queue in the same order in which said requests to perform said corresponding I/O transactions are requested,
(c) performing said I/O transactions in an order that is independent of said order in which said I/O requests corresponding to said I/O transactions are stored in said submitted I/O transaction queues, and
(d) maintaining continuity of said streams by retrieving said I/O descriptors from said respective submitted I/O transaction queue in the same order in which said I/O transactions are requested and independently of a specific order in which said I/O transactions corresponding to said I/O descriptors were performed.

18. The method of claim 17 wherein said step (c) further comprises the steps of:
(c1) enqueuing one or more command descriptors for performing I/O transactions, corresponding to each request that issued during said cycle i, into an inactive periodic queue, during said cycle i,
(c2) delaying performing said I/O transactions of said command descriptors in said inactive periodic queue until said cycle i+1,
(c) at a beginning of said cycle i+1, placing said command descriptors in said inactive periodic queue into an active periodic queue, wherein during each cycle, I/O transactions are performed for each command descriptor in said active periodic queue, but not performed for command descriptors in said inactive periodic queue.

19. The method of claim 17 further comprising, prior to said step (a), the steps of:
(e) opening a chunk assigned to a particular stream on which one or more I/O transactions are to be performed and allocating resources for said chunk.

20. The method of claim 19 further comprising the steps of:
(e1) allocating bandwidth for transmitting data read or written during said I/O transaction,
(e2) generating an open descriptor for said stream including a queue for storing I/O descriptors for submitted pending I/O transaction requests, and
(e3) generating a completion context in which command descriptors for completed I/O transactions are enqueued.

21. The method of claim 20 further comprising the steps of:
(f) if said chunk is closed but a second chunk is specified to be opened immediately thereafter, assigning said resources allocated to said chunk to said second chunk.

22. The method of claim 18 further comprising the steps of:
(e) prior to said cycle i+1, ordering each command descriptor in said inactive periodic queue to increase the number of I/O transactions that can be performed during said cycle i+1, and
(f) during said cycle i+1:
(g1) dequeuing up to a predetermined number of command descriptors from the head of said active periodic queue and enqueuing each of said dequeued command descriptors into an in-progress queue, and
(g2) sequentially issuing to an array of at least one disk, a command for performing said I/O transaction corresponding to each command descriptor in said in-progress queue.

23. The method of claim 18 further comprising the steps of, as each I/O transaction completes:
(e) dequeuing said command descriptor corresponding to said completed I/O transaction,
(f) enqueuing said dequeued command descriptor corresponding to said completed I/O transaction onto a completion context corresponding to a stream for which said I/O transaction was performed, and
(g) signaling a semaphore associated with said completion context onto which said command descriptor for said completed I/O transaction was dequeued.

24. The method of claim 22 further comprising the steps of:
(h) as each I/O transaction completes, dequeuing said command descriptor corresponding to said completed I/O transaction,
(i) if said active periodic queue is not empty, performing said steps (g), (g1) and (g2) and
(j) if said active periodic queue is empty, dequeuing from an aperiodic queue one or more command descriptors for performing I/O transactions other than for reading or writing stream data, enqueuing each command descriptor that was dequeued from said aperiodic queue into said in-progress queue and sequentially issuing a command for performing said I/O transaction corresponding to each command descriptor in said in-progress queue.

25. The method of claim 22 further comprising the step of:

(h) if at the end of said cycle i+1, at least one I/O transaction corresponding to a command descriptors enqueued into said active periodic queue at said start of said cycle i+1 is not complete, adjusting a duration of said cycle i+2 to prevent drifting of boundaries of said cycles.

26. The method of claim 17 further comprising the step of:

(e) limiting the number of outstanding submitted requests for performing I/O transactions for each stream to a predetermined maximum number.

27. The method of claim 26 further comprising the steps of:

(f) dequeuing an I/O descriptor from a submitted I/O transaction queue of a particular stream when said I/O transaction corresponding to said I/O descriptor completes, and (g) decreasing a count of the number of outstanding submitted requests for performing I/O transactions on said particular stream.

28. The method of claim 17 further comprising the step of:
predefining the cycle time duration as $N_d S/W_{base}$, where $N_d$ is the number of disks in the array, S is the number of bits consumed or produced for each stream during the cycle and $W_{base}$ is a base bandwidth of each stream.

* * * * *